US008382296B2

(12) United States Patent
Itoh et al.

(10) Patent No.: US 8,382,296 B2
(45) Date of Patent: Feb. 26, 2013

(54) INFORMATION PROCESSOR WITH PROJECTOR

(75) Inventors: Tatsuo Itoh, Osaka (JP); Tetsuro Mizushima, Hyogo (JP); Kenji Nakayama, Osaka (JP); Tomoya Sugita, Nara (JP); Hiroyuki Furuya, Osaka (JP); Shinichi Kadowaki, Hyogo (JP); Yoshitaka Kitaoka, Osaka (JP); Kazumi Ohtsubo, Fukuoka (JP); Hirofumi Enomoto, Osaka (JP); Yuichi Hatase, Osaka (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 12/851,826

(22) Filed: Aug. 6, 2010

(65) Prior Publication Data
US 2011/0043766 A1  Feb. 24, 2011

Related U.S. Application Data

(60) Provisional application No. 61/235,134, filed on Aug. 19, 2009.

(51) Int. Cl.
*G03B 21/14* (2006.01)
(52) U.S. Cl. ............... 353/119; 353/72; 353/79; 353/94; 353/98; 353/122; 349/8; 345/905

(58) Field of Classification Search ............... 353/31, 353/37, 38, 72, 79, 94, 98, 99, 119, 122; 349/5, 7, 8, 9; 345/905, 80–100, 7, 8; 248/535, 248/536, 917, 918, 923
See application file for complete search history.

(56) References Cited

U.S. PATENT DOCUMENTS

| | | | | |
|---|---|---|---|---|
| 6,806,850 | B2 * | 10/2004 | Chen ........................... | 345/7 |
| 7,443,657 | B2 * | 10/2008 | Gitzinger et al. ........ | 361/679.27 |
| 7,520,622 | B2 * | 4/2009 | Gohman .................... | 353/72 |
| 7,862,185 | B2 * | 1/2011 | Noba ......................... | 353/119 |
| 7,926,958 | B2 * | 4/2011 | Choi et al. ................. | 353/119 |
| 8,011,790 | B2 * | 9/2011 | Nagashima et al. ....... | 353/71 |
| 2005/0237499 | A1 * | 10/2005 | Oross et al. ................ | 353/119 |
| 2007/0211225 | A1 * | 9/2007 | Kondo et al. .............. | 353/94 |
| 2009/0027620 | A1 * | 1/2009 | Lin et al. .................... | 353/15 |
| 2009/0262306 | A1 * | 10/2009 | Quinn et al. ............... | 353/25 |

FOREIGN PATENT DOCUMENTS

JP          10-69328          3/1998

\* cited by examiner

*Primary Examiner* — Georgia Y Epps
*Assistant Examiner* — Sultan Chowdhury
(74) *Attorney, Agent, or Firm* — Wenderoth, Lind & Ponack, L.L.P.

(57) ABSTRACT

An information processor includes a housing, a projector attached to the housing, and a screen attached to the housing, wherein the projector projects light onto the screen.

24 Claims, 25 Drawing Sheets

FIG.16
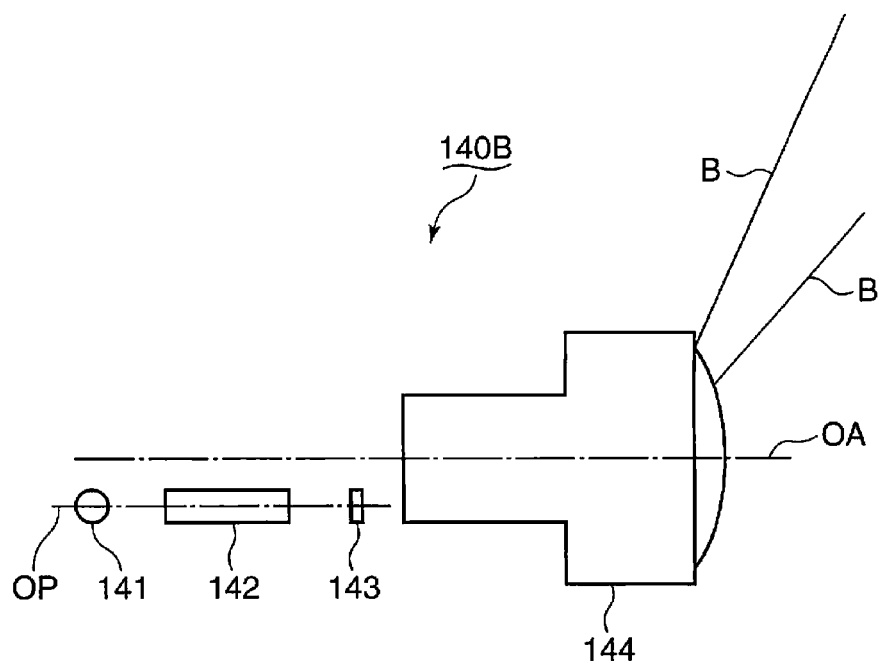
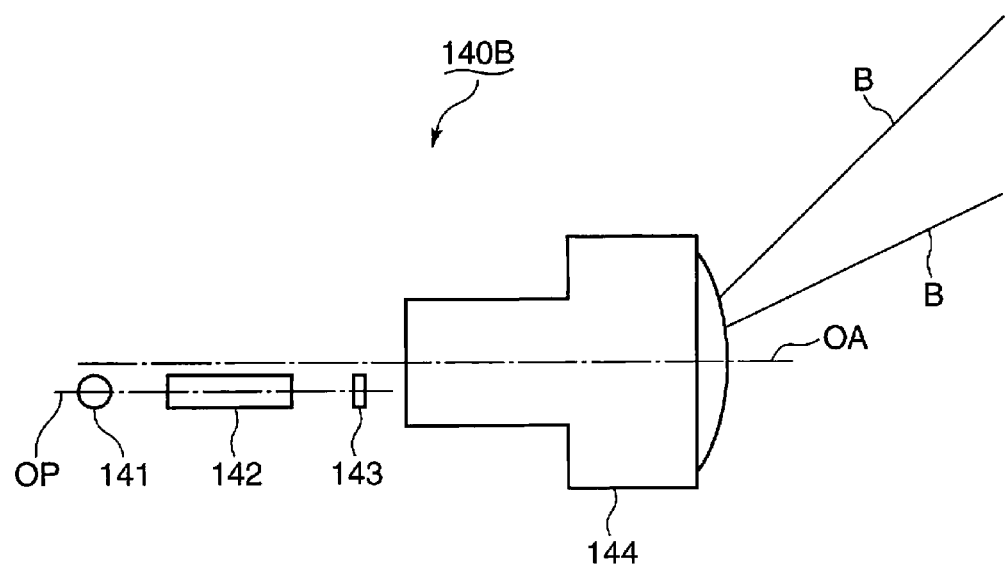

FIG.20
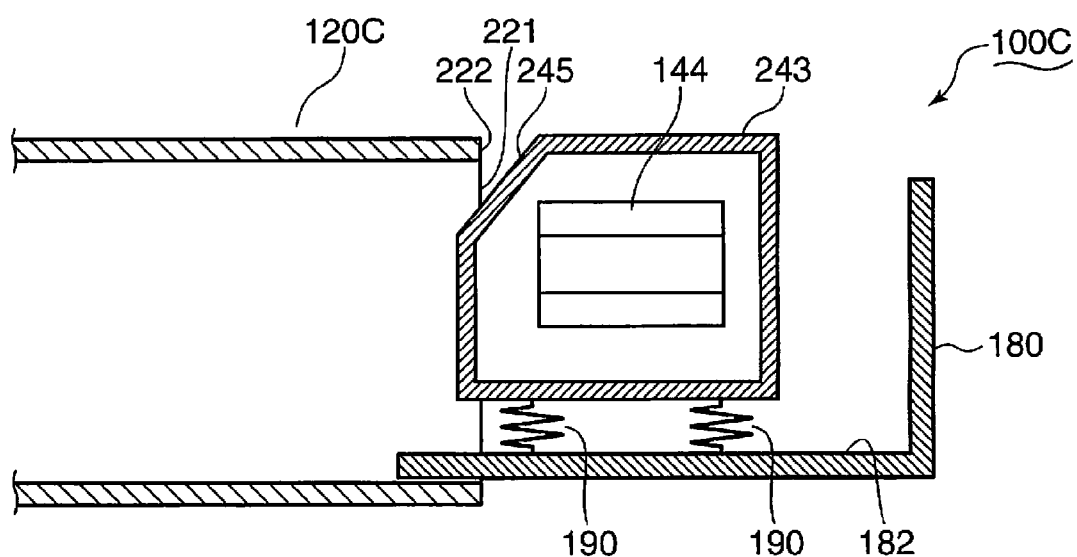
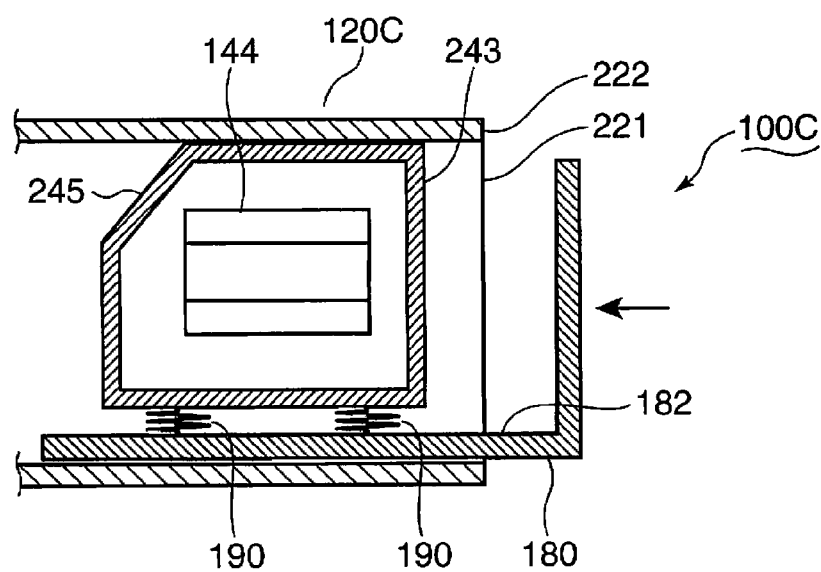

INFORMATION PROCESSOR WITH PROJECTOR

This application claims the benefit of U.S. Provisional Application No. 61/235,134, filed Aug. 19, 2009.

BACKGROUND OF THE INVENTION

I. Technical Field

The present invention relates to an information processor with a projector.

II. Description of the Related Art

A mobile information processor such as a laptop personal computer and a mobile phone is typically incorporated with a liquid crystal display on which an image is displayed. JP Hei 10-69328A discloses a laptop personal computer incorporated with a projector in addition to a liquid crystal display to display an image.

The laptop personal computer disclosed in JP Hei 10-69328A displays an image on the liquid crystal display and projects image light from the projector. As a result of the above configuration, the personal computer disclosed in JP Hei 10-69328A is operable to appropriately provide a number of viewers with an image. Further, the personal computer disclosed in JP Hei 10-69328A is operable to provide an image only by using the liquid crystal display, as necessary.

Displaying a larger image by a liquid crystal display resultantly requires an increase in a size of the liquid crystal display. Accordingly, a larger increase in the production cost is required to produce an information processor capable of displaying the larger image.

The laptop personal computer disclosed in JP Hei 10-69328A also results in a larger increase in the production cost because it comprises not only the liquid crystal display but also the projector.

SUMMARY OF THE INVENTION

An object of the invention is to provide an information processor configured to display a desired size of an image at a lower production cost.

An information processor according to an aspect of the invention includes a housing, a projector attached to the housing, and a screen attached to the housing, wherein the projector projects light onto the screen.

BRIEF DESCRIPTION OF THE DRAWINGS

FIG. 16 is a diagram schematically showing the optical path adjustment performed by the adjustment mechanism shown in FIG. 13 or the adjustment mechanism shown in FIG. 14.

FIG. 20 is a cross-sectional view schematically showing a support mechanism in the personal computer shown in FIGS. 17 through 19.

DETAILED DESCRIPTION OF THE INVENTION

Figure 1:
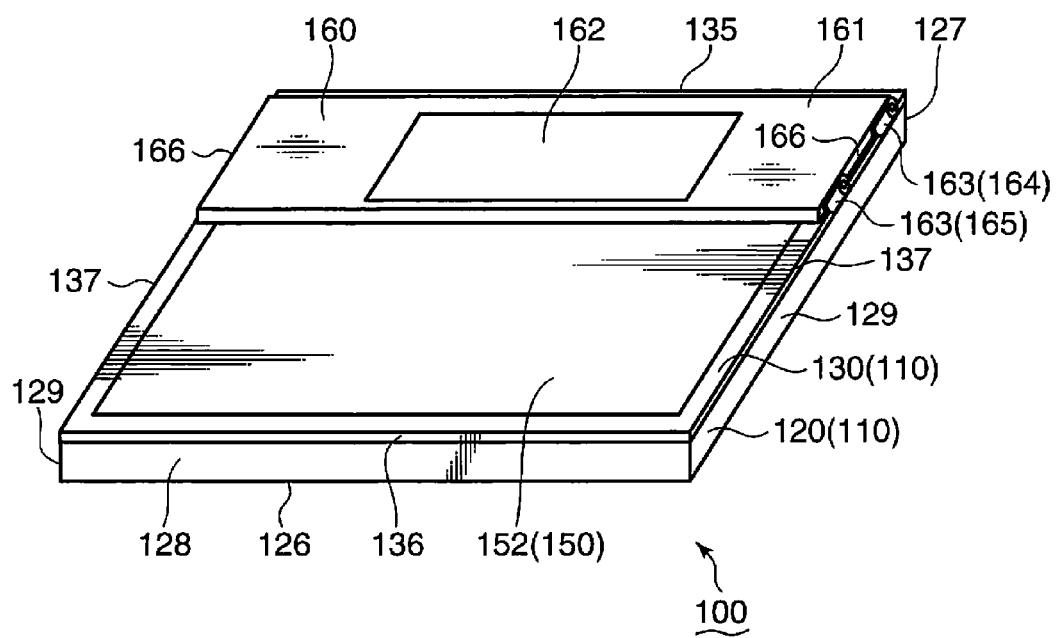
FIG. 1 is a schematic perspective view of a personal computer exemplified as an information processor in accordance with a first embodiment of the invention.

In the following, information processors in accordance with embodiments of the invention are described referring to the accompanying drawings. In the following embodiments, like elements are indicated with like reference numerals. Further, to simplify the description, repetitive description is omitted as necessary. The arrangement, the disposition or the configuration illustrated in the drawings as well as the description relating to the drawings are provided for easy understanding of the principle of the following embodiments, and the principle to be described by way of the following embodiments is not limited to the following.

First Embodiment

Figure 2:
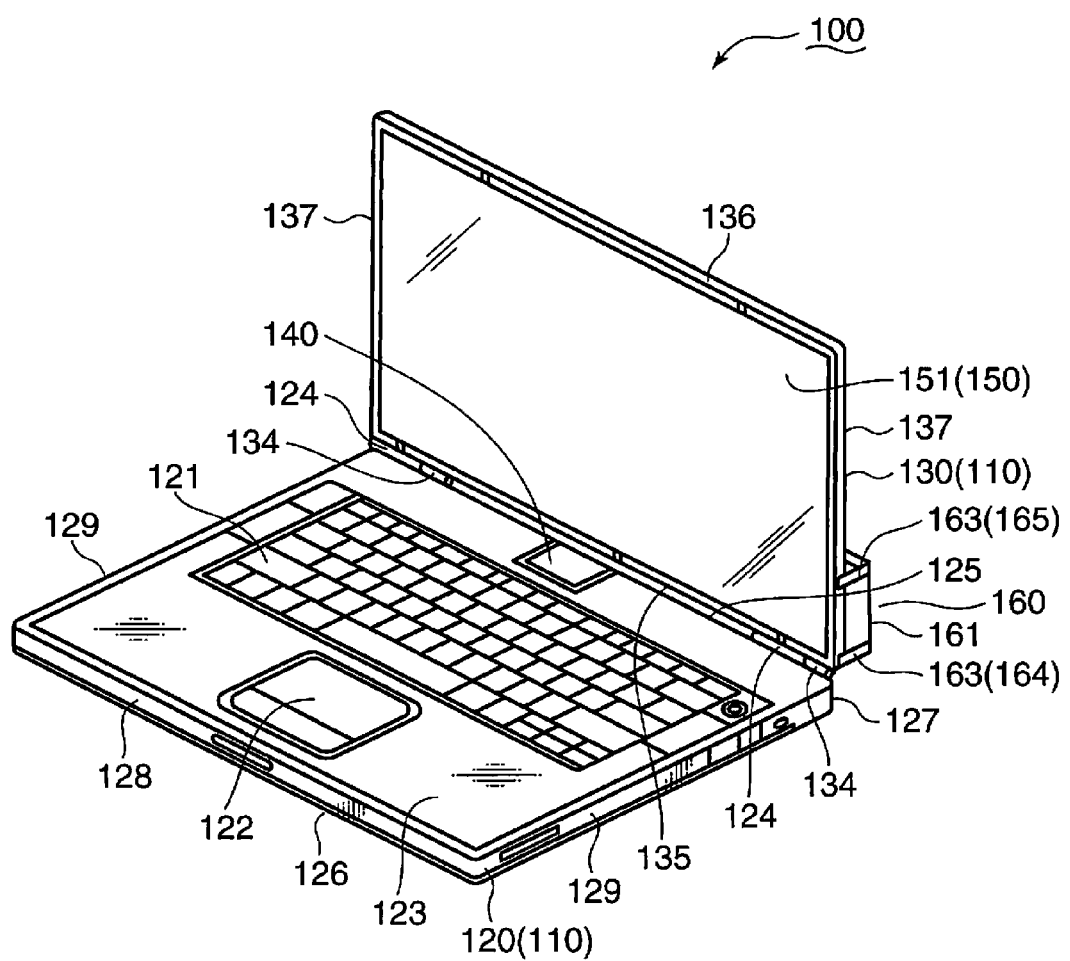
FIG. 2 is a schematic perspective view of a personal computer exemplified as the information processor in accordance with the first embodiment.

FIGS. 1 and 2 are schematic perspective views of a personal computer. In this embodiment, a laptop personal computer is exemplified as an information processor. Alternatively, a mobile phone or another device for processing information may be used as the information processor.

A personal computer 100 is provided with a generally rectangular planar housing 110. The housing 110 includes a generally rectangular planar first housing 120 and a second housing 130 rotatably attached to the first housing 120. The first housing 120 includes a generally rectangular top surface 123 provided with keys 121 and a touch pad 122. The keys 121 and the touch pad 122 may be substantially the same as those of a typical personal computer. The user is allowed to input information to be processed to the personal computer 100 through the keys 121 and/or the touch pad 122. In this embodiment, the keys 121 and/or the touch pad 122 is exemplified as an input section for allowing the user to input information to be processed. Alternatively, other interfaces for allowing the user to input information to the personal computer may be used as the input section. In this embodiment, the top surface 123 of the first housing 120 is exemplified as an input surface formed with the input section.

The top surface 123 of the first housing 120 includes a back surface edge 125 formed with a pair of generally cylindrical first hinge portions 124 configured to rotatably support the second housing 130. The second housing 130 includes a base end edge 135 formed with generally cylindrical second hinge portions 134 connected to the first hinge portions 124. For instance, a shaft (not shown) may be received through the first hinge portions 124 and the second hinge portions 134. The second housing 130 is rotated around the shaft. The structure configured to rotatably connect the first housing 120 with the second housing 130 may be substantially the same as that of a typical laptop computer. The second housing 130 is rotatable between a first position (see FIG. 1) where the second housing 130 is folded over the first housing 120 and a second position (see FIG. 2) where the second housing 130 stands upright with respect to the first housing 120. In the following description, the direction toward the first housing 120 with respect to the second housing 130 in the second position is called as a front side or a front side direction; and a side opposite to the front side or a direction opposite to the front side direction is called as a back side or a back side direction.

The first housing 120 accommodates therein devices (e.g. an electronic circuit) configured to process information inputted through the keys 121 and/or the touch pad 122. The devices in the first housing 120 may be substantially the same as those of a typical personal computer.

The personal computer 100 is provided with a projector 140 and a screen 150 attached to the housing 110. The first housing 120 supports the projector 140. The second housing 130 supports the screen 150.

The projector 140 disposed in proximity to the back surface edge 125 of the first housing 120 projects light (e.g. image light) in the back side direction. When the second housing 130 is in the second position, the light irradiated from the projector 140 is finally projected onto the screen 150.

The second housing 130 is a generally rectangular frame member. The screen 150 is stretched over the second housing 130 so as to cover a generally rectangular opening of the second housing 130. The screen 150 includes a first surface 151 confronting the top surface 123 of the first housing 120 when the second housing 130 is in the first position and a second surface 152 opposing to the first surface 151. The second surface 152 forms a part of a top plane of the personal computer 100 when the second housing 130 is in the first position, so that the second housing 130 and the screen 150 cover the top surface 123 of the first housing 120. Accordingly, the second housing 130 and the screen 150 serve as a cover for protecting the personal computer 100 from potential intrusion of foreign objects (e.g. dusts) into the personal computer 100.

As described above, the screen 150 is attached to the second housing 130 rotatably connected to the first housing 120. Therefore, the tilt angle of the screen 150 with respect to the first housing 120 is properly adjustable. When the second housing 130 is in the second position, the light from the projector 140 built in the first housing 120 is properly projected onto the screen 150.

The personal computer 100 is provided with a mirror mechanism 160 attached to the second housing 130. The mirror mechanism 160 reflects to the second surface 152 of the screen 150 the light emitted from the projector 140 in the back side direction.

Figure 3:
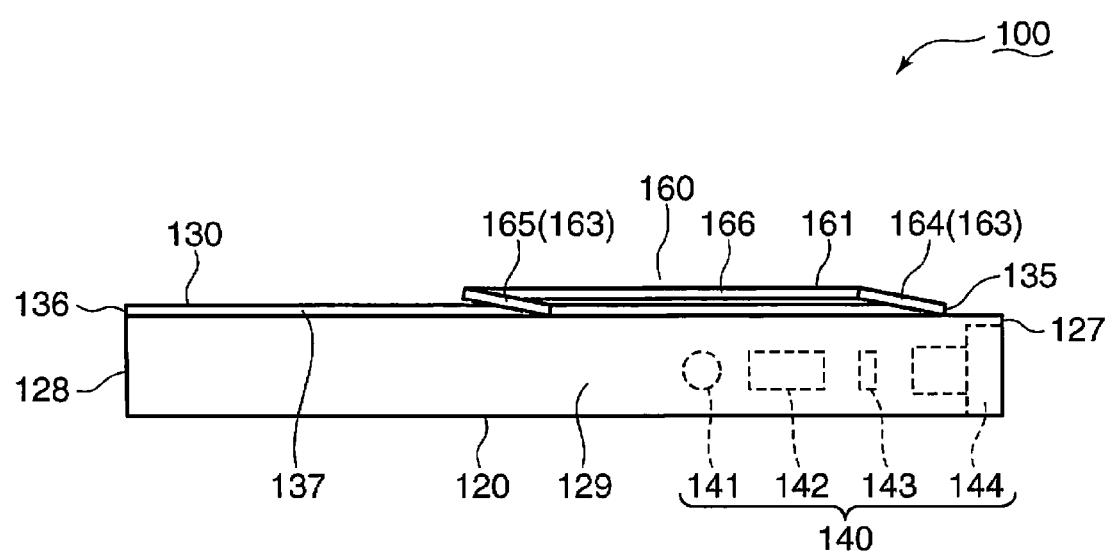
FIG. 3 is a schematic side view of the personal computer shown in FIG. 1.
Figure 4:
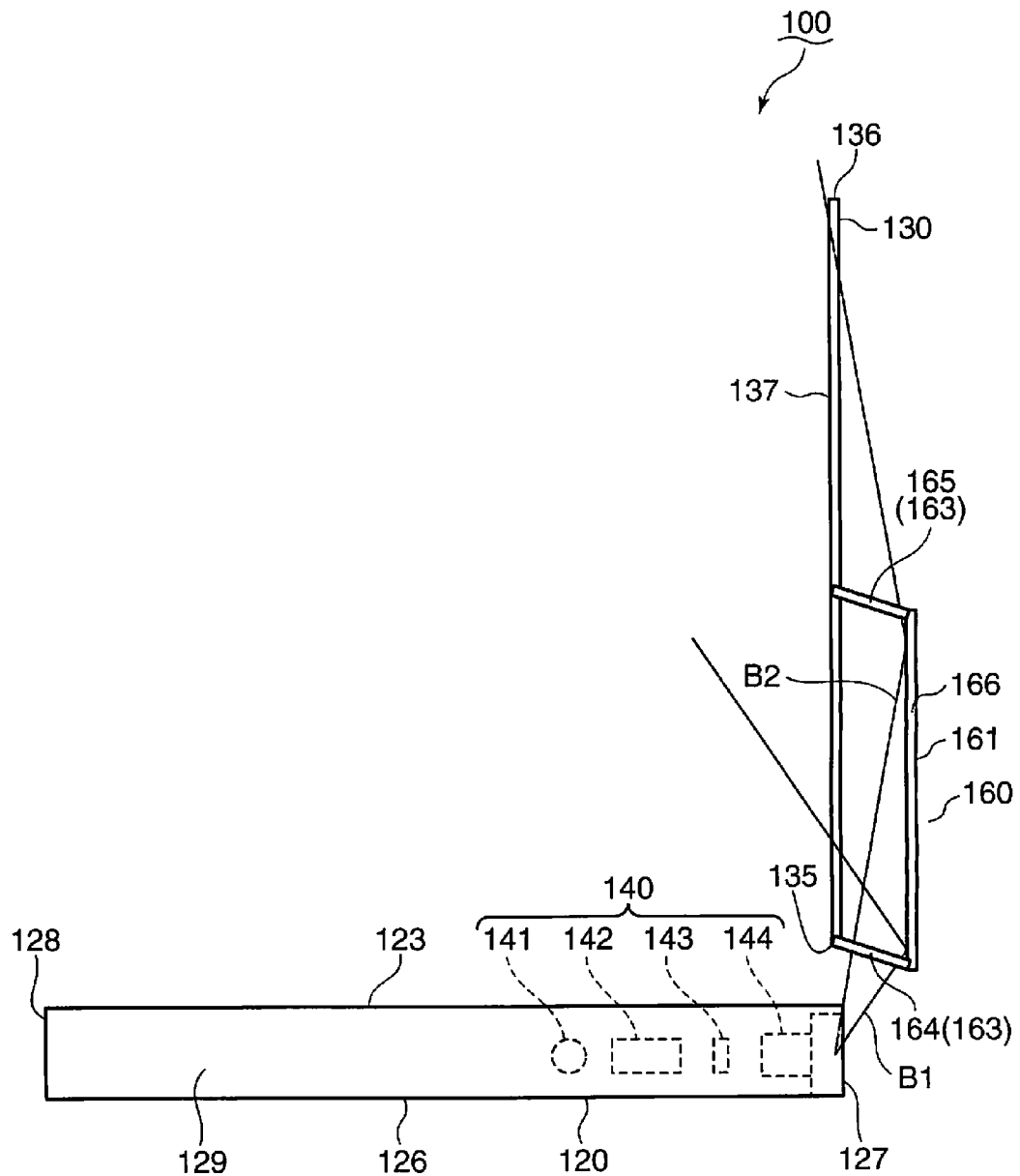
FIG. 4 is a schematic side view of the personal computer shown in FIG. 2.

FIG. 3 is a schematic side view of the personal computer 100 including the second housing 130 in the first position. FIG. 4 is a schematic side view of the personal computer 100 including the second housing 130 in the second position. Referring to FIGS. 1 through 4, the personal computer 100 is further described.

The mirror mechanism 160 is provided with a generally rectangular support plate 161, a generally rectangular mirror element 162 supported by the support plate 161, and a link mechanism 163 configured to connect the support plate 161 to the second housing 130. When the second housing 130 is in the first position, the link mechanism 163 moves the support plate 161 and the mirror element 162 toward the second surface 152 of the screen 150. When the second housing 130 is in the second position, the link mechanism 163 moves the support plate 161 and the mirror element 162 away from the second surface 152 of the screen 150.

The projector 140 includes a light source 141 configured to generate the light to be projected onto the screen 150, an optical element group 142 configured to adjust the light from the light source 141, a modulation element 143 configured to modulate the light transmitted through the optical element group 142 to form e.g. an image, and a projection lens 144 configured to project the light transmitted through the modulation element 143 onto the screen 150. The light source 141 includes e.g. a light emitting diode, a semiconductor laser or a diode-pumped solid-state laser. In this embodiment, the light source 141 emits light with a light component of a specific wavelength (e.g. a red light component with a red hue, a green light component with a green hue and a blue light component with a blue hue). The optical element group 142 adjusts e.g. an optical path or light flux diameter of the light emitted from the light source 141. The modulation element 143 may be e.g. a liquid crystal element configured to form a desired image. The light transmitted through the modulation element 143 is emitted from the projection lens 144 to the exterior of the first housing 120 as image light.

The first housing 120 includes, in addition to the top surface 123, a bottom surface 126 opposite to the top surface 123, and a peripheral surface between the top surface 123 and the bottom surface 126. The peripheral surface of the first housing 120 includes a back wall 127 defined on the back side, a front wall 128 opposite to the back wall 127, and a pair of side walls 129 between the back wall 127 and the front wall 128.

In this embodiment, the projection lens 144 is exposed at a substantially central position of the back wall 127 of the first housing 120.

A peripheral edge of the second housing 130 includes, in addition to the aforementioned base end edge 135, a leading edge 136 opposite to the base end edge 135, and a pair of side edges 137 respectively connecting both ends of the base end edge 135 with both ends of the leading edge 136. In this embodiment, the link mechanism 163 of the mirror mechanism 160 includes a first linking rod 164 including a base end rotatably connected to an end of the corresponding side edge 137 intersecting with the base end edge 135, and a second linking rod 165 including a base end to be rotatably connected to the corresponding side edge 137 at a position away from the first linking rod 164. A leading end of the first linking rod 164 and a leading end of the second linking rod 165 are rotatably connected to ends of side edges 166 of the support plate 161, respectively. Thus, the mirror element 162 connected to the support plate 161 is moved toward and away from the screen 150.

In this embodiment, the link mechanism 163 includes the first linking rod 164 and the second linking rod 165. Alternatively, the link mechanism 163 may include any linking element operable to automatically or manually move the support plate 161 and the mirror element 162 toward and away from the screen 150.

When the second housing 130 is in the second position, the support plate 161 and the mirror element 162 are disposed at a position on the back side away from the second housing 130. The projector 140 emits the image light from the projection lens 144 toward the mirror element 162 mounted at a generally center of the support plate 161. In FIG. 4, the light emitted from the projector 140 is shown as light beams B1 and B2. In FIG. 4, the lower light beam B1 to display a lower portion of an image is reflected on the mirror element 162 toward the second surface 152 of the screen 150. Further, in FIG. 4, the upper light beam B2 to display an upper portion of the image is reflected on the mirror element 162 toward the second surface 152 of the screen 150.

The link mechanism 163 determines the distance between the mirror element 162 and the screen 150 so that a sufficiently long optical path is defined between the projection lens 144 and the screen 150. Further, the link mechanism 163 determines the angle of a reflection surface of the mirror element 162 with respect to the second surface 152 of the screen 150 to decrease image distortion on the screen 150 as much as possible.

The screen 150 transmits the image light projected onto the second surface 152 through the first surface 151. Thus, the user is allowed to observe an image displayed on the first surface 151 of the screen 150 from the front side. Optionally the screen 150 may specifically transmit a light component of a specific wavelength. For instance, in the case where the light source 141 of the projector 140 emits the light (image light) with a red light component, a green light component and a blue light component, the screen 150 may transmit the red light component, the green light component and the blue light component at a larger amount than a light component with another hue. Thereby, the user is allowed to observe a clearer image.

Figure 5:
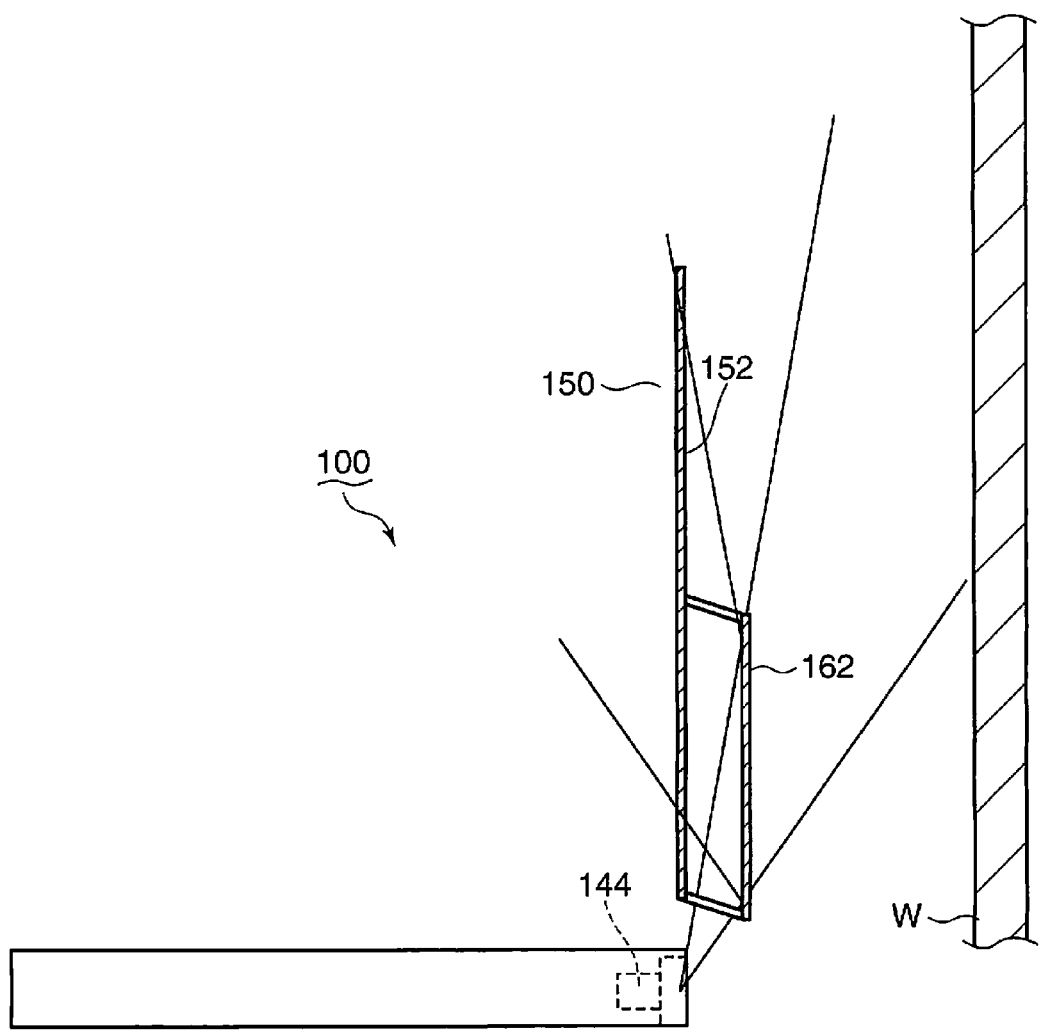
FIG. 5 is a diagram for schematically showing an optical path defined by a partial reflection mirror incorporated in the personal computer shown in FIG. 2.

FIG. 5 is a schematic side view of the personal computer 100 incorporated with a partial reflection mirror as the mirror element 162.

A partial reflection mirror may be used as the mirror element 162, in place of the mirror element 162 as the total reflection mirror shown in FIG. 4. A part of light impinged on the mirror element 162 after emission from the projection lens 144 is reflected thereon to define a first optical path directed to the second surface 152 of the screen 150. The other part of the light impinged on the mirror element 162 after emission from the projection lens 144 is transmitted through the mirror element 162 to define a second optical path in the back side of the mirror element 162. Light along the second optical path is projected onto a wall portion W disposed in the back side of the personal computer 100. Thereby, persons other than the user in the front side of the screen 150 are also allowed to observe an image projected onto the wall portion W.

Figure 6:
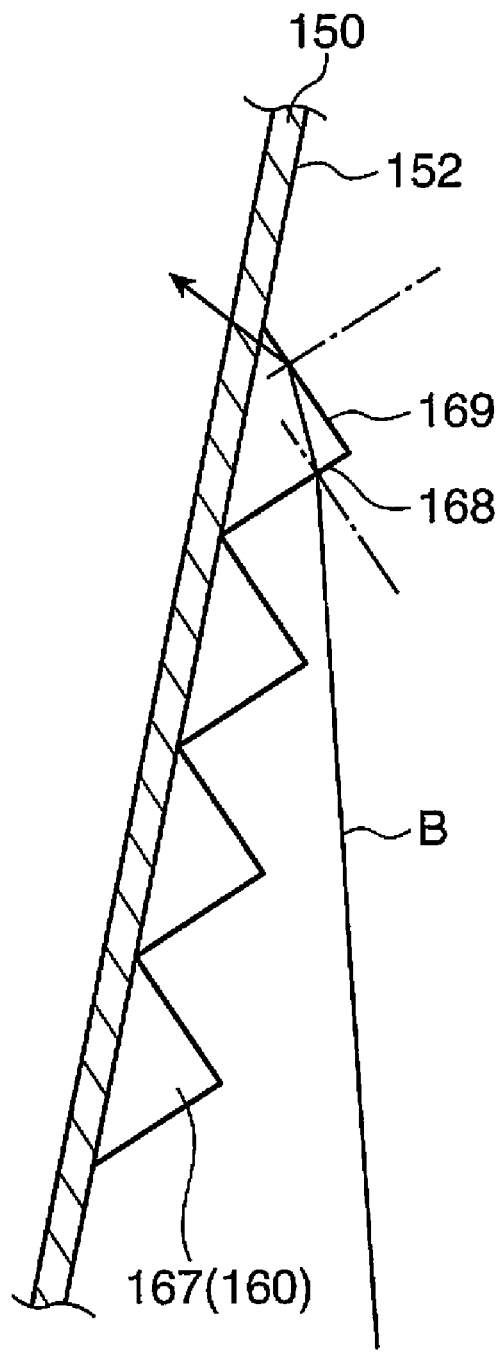
FIG. 6 is a diagram for schematically showing an optical path adjusted by a prism element incorporated in the personal computer shown in FIG. 2.

FIG. 6 is a schematic cross-sectional view of the screen 150. Referring to FIGS. 4 and 6, the mirror mechanism 160 is described in detail.

The mirror mechanism 160 configured to adjust the optical path of the light emitted from the projection lens 144 of the projector 140 may be provided with a prism element as necessary. In this embodiment, a triangular prism 167 is used as the prism element.

As shown in FIG. 4, the upper light beam B2 reflected on the mirror element 162 has a larger incident angle with respect to the second surface 152 of the screen 150, as compared with the lower light beam B1. A larger incident angle with respect to the second surface 152 increases an amount of light not to be perceived by the user (i.e. increases the light loss). As shown in FIG. 6, the light beam B2 is reflected and/or refracted in a direction normal to the second surface 152 by the triangular prism 167 disposed on the second surface 152 of the screen 150, thereby reducing the aforementioned light amount loss. A light beam B incident into a lower slope 168 of the triangular prism 167 is refracted, so that the incident angle of the light beam B with respect to the second surface 152 of the screen 150 is reduced. Thereafter, the light beam B is reflected on an upper slope 169 of the triangular prism 167, so that the incident angle of the light beam B with respect to the second surface 152 of the screen 150 is further reduced. Thus, the incident angle of the light beam B with respect to the second surface 152 of the screen 150 is properly reduced.

A plurality of the triangular prisms 167 may be continuously placed on the second surface 152 of the screen 150. Alternatively, the triangular prisms 167 may be disposed on the second surface 152 of the screen 150 at a desired interval. Triangular prisms 167 with a generally same shape and/or a generally same cross-sectional size may be disposed on the second surface 152 of the screen 150. Alternatively, the shape and/or the size of the triangular prisms 167 on the second surface 152 of the screen 150 may be different from each other. For instance, a triangular prism 167 for the light beam B2 shown in FIG. 4 may refract and/or reflect it with a larger angle than a triangular prism 167 for the light beam B1.

Another optical element configured to change an optical path of light may be used as a prism element configured to reduce the incident angle of the light directed to the second surface 152 of the screen 150. For instance, an optical element configured to change the incident angle of the light beam B only by refraction or an optical element configured to change the incident angle of the light beam B only by reflection may be used as the prism element.

A liquid crystal panel may be unnecessary for the personal computer 100 described referring to FIGS. 1 through 5 because its screen 150 attached to the housing 110 functions as a cover and a display surface. Further, the screen 150 and the projector 140, which are operable to be carried as one unit, enhances usability of the personal computer 100. The mirror element 162 defining a longer optical path within a narrower space contributes to providing the compact personal computer 100. Further, if the partial reflection mirror is used as the mirror element 162, it is possible to project an image onto an object (e.g. the wall portion W shown in FIG. 5) in the back side of the personal computer 100. Thus, a desired size of an image is presented to a number of persons by adjusting the distance between the personal computer 100 and the object in the back side. This causes the personal computer 100 to display a large image without any constraints on the size of the mirror element 162. A light emitting diode, a semiconductor laser or a diode-pumped solid-state laser to be used as the light source 141 of the projector 140 contributes to miniaturization of the projector 140. Further, these kinds of the light sources 141 contribute to an increase in luminance of the projector 140. Thus, the compact and higher luminance personal computer 100 may be appropriately provided.

Second Embodiment

Figure 7:
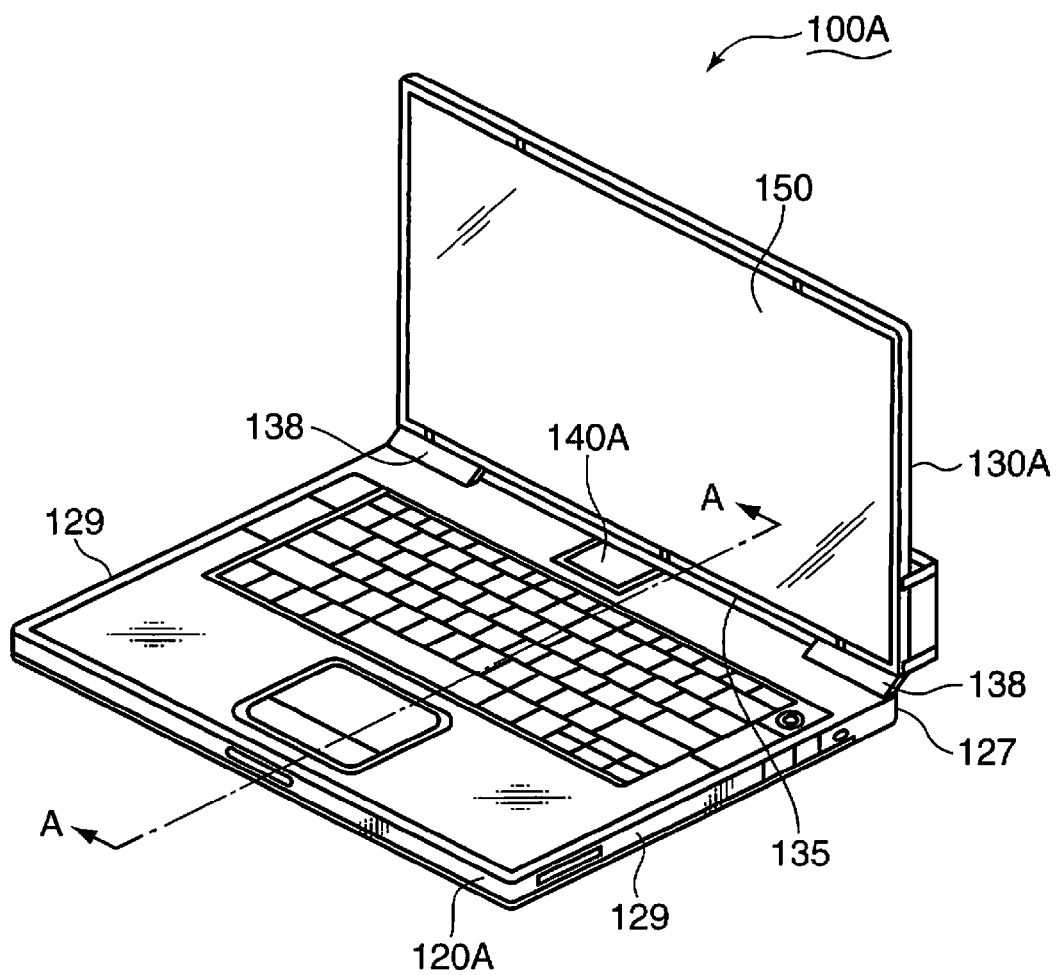
FIG. 7 is a schematic perspective view of a personal computer exemplified as an information processor in accordance with a second embodiment of the invention.

FIG. 7 is a schematic perspective view of a personal computer exemplified as an information processor in accordance with the second embodiment. Like elements as in the first embodiment are indicated with like reference numerals. Different features from those in the first embodiment are described referring to FIG. 7. The second embodiment is mainly different from the first embodiment in a structure for holding a projector. Description in the first embodiment is appropriately applied to the elements which are not described in the following.

Similarly to the personal computer 100 of the first embodiment, a personal computer 100A according to the second embodiment is provided with a first housing 120A and a second housing 130A. The second housing 130A includes a pair of protrusion pieces 138 protruding in the interior of the first housing 120A from a base end edge 135. The protrusion pieces 138 are interconnected to a shaft extending in the interior of the first housing 120A. The shaft extends along a back wall 127 of the first housing 120A. The second housing 130A is rotated around the shaft in the first housing 120A between the first position and the second position.

In this embodiment, the second housing 130A is connected to the shaft in the first housing 120A by way of the protrusion pieces 138. Alternatively, another connection structure configured to connect the second housing 130A to the shaft in the first housing 120A may be used to connect between the first housing 120A and the second housing 130A.

The personal computer 100A is provided with a projector 140A. The projector 140A is attached to the first housing 120A at a generally same position as the projector 140 in the first embodiment. Whereas the projector 140 in the first embodiment is fixedly attached to the first housing 120, the projector 140A in the second embodiment is rotatably attached to the first housing 120A. In this embodiment, rotation of the projector 140A is associated with rotation of the second housing 130A.

Figure 8:
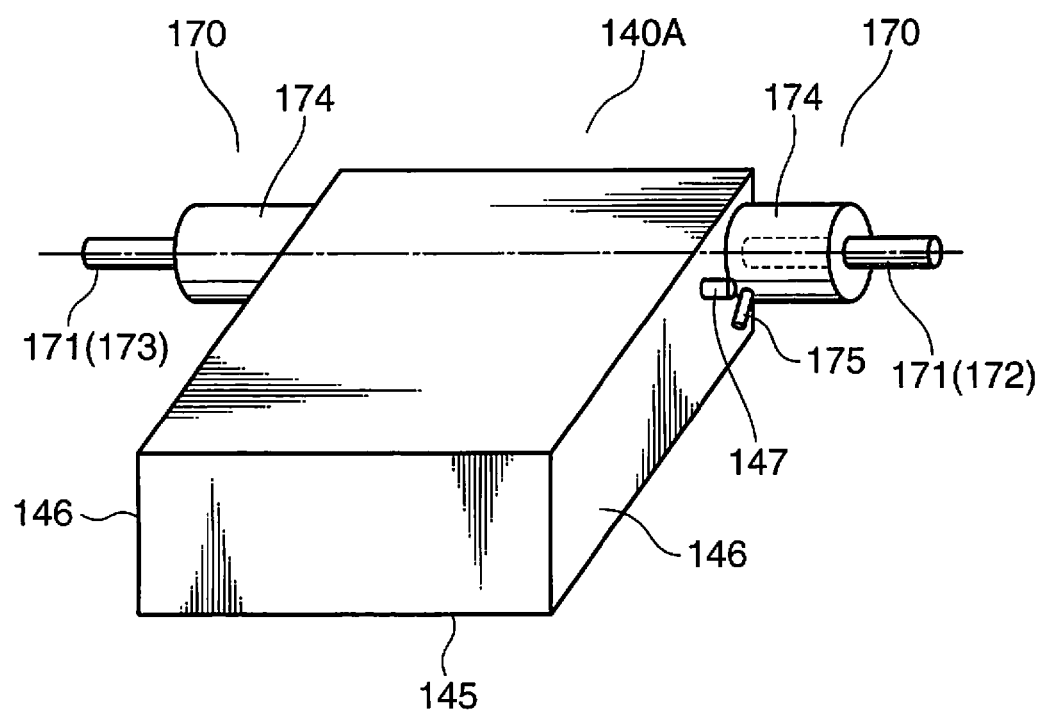
FIG. 8 is a schematic perspective view of an adjustment mechanism incorporated in the personal computer shown in FIG. 7.

FIG. 8 is a schematic perspective view of the projector 140A and an adjustment mechanism configured to adjust an optical path of light from the projector 140A in cooperation with the rotation of the second housing 130A with respect to the first housing 120A. The adjustment mechanism is described referring to FIGS. 7 and 8.

The personal computer 100A is provided with an adjustment mechanism 170 formed in the first housing 120A. The adjustment mechanism 170 includes a shaft 171 extending along the back wall 127 of the first housing 120A. As described above, the second housing 130A is connected to the shaft 171 by way of the protrusion pieces 138. The shaft 171 is integrally rotated in accordance with the rotation of the second housing 130A between the first position and the second position. Both ends of the shaft 171 may be rotatably connected to side walls 129 of the first housing 120A.

The projector 140A is provided with a generally rectangular parallelepiped shell 145. The shell 145 accommodates therein optical elements (e.g. a light source 141, an optical element group 142, a modulation element 143 and a projection lens 144 as described referring to FIGS. 3 and 4) configured to generate light to be projected onto a screen 150. The shell 145 is provided with a pair of shell side walls 146 confronting the paired side walls 129 of the first housing 120A, respectively.

The shaft 171 includes a first shaft 172 and a second shaft 173 connected to the paired shell side walls 146, respectively. The first shaft 172 and the second shaft 173, which are aligned in an array, rotatably support the shell 145. In this arrangement, the shaft 171 is connected to the shell 145 without extending in the shell 145. Thus, interference between the shaft 171 and an optical path defined in the shell 145 is properly less likely to occur. As will be described later, the projector 140A is rotated around the shaft 171. Connecting positions between the first shaft 172/the second shaft 173 and the shell 145 are determined so that a principal point of the projection lens 144 (see FIG. 3 and/or FIG. 4) is located on a straight line connecting a connecting point between the first shaft 172 and the corresponding shell side wall 146 to a connecting point between the second shaft 173 and the corresponding shell side wall 146. In this configuration, the projection lens 144 is rotated around a rotational axis passing through the principal point at which the rotational axis intersects with the optical axis of the projection lens 144 orthogonal to the rotational axis.

The adjustment mechanism 170 is provided with ring members 174 mounted on the shaft 171. The ring members 174 are integrally mounted on the shaft 171. Therefore, the ring members 174 are rotated along with rotation of the shaft 171. The ring members 174 are rotated independently of rotation of the projector 140A. In this embodiment, the ring members 174 include a first pin 175. The first pin 175 protruding from an outer surface of the ring member 174 is exemplified as a revolving element configured to revolve around the shaft 171 serving as a rotational axis of the second housing 130A.

The shell 145 includes a second pin 147 protruding from the corresponding shell side wall 146. The first pin 175 revolving around the shaft 171 in accordance with rotation of the ring member 174 is contacted with the second pin 147. As the ring member 174 is further rotated, the first pin 175 pushes the projector 140A upward by way of the second pin 147. As a result of the above operation, the projector 140A is rotated around the shaft 171.

Figure 9:
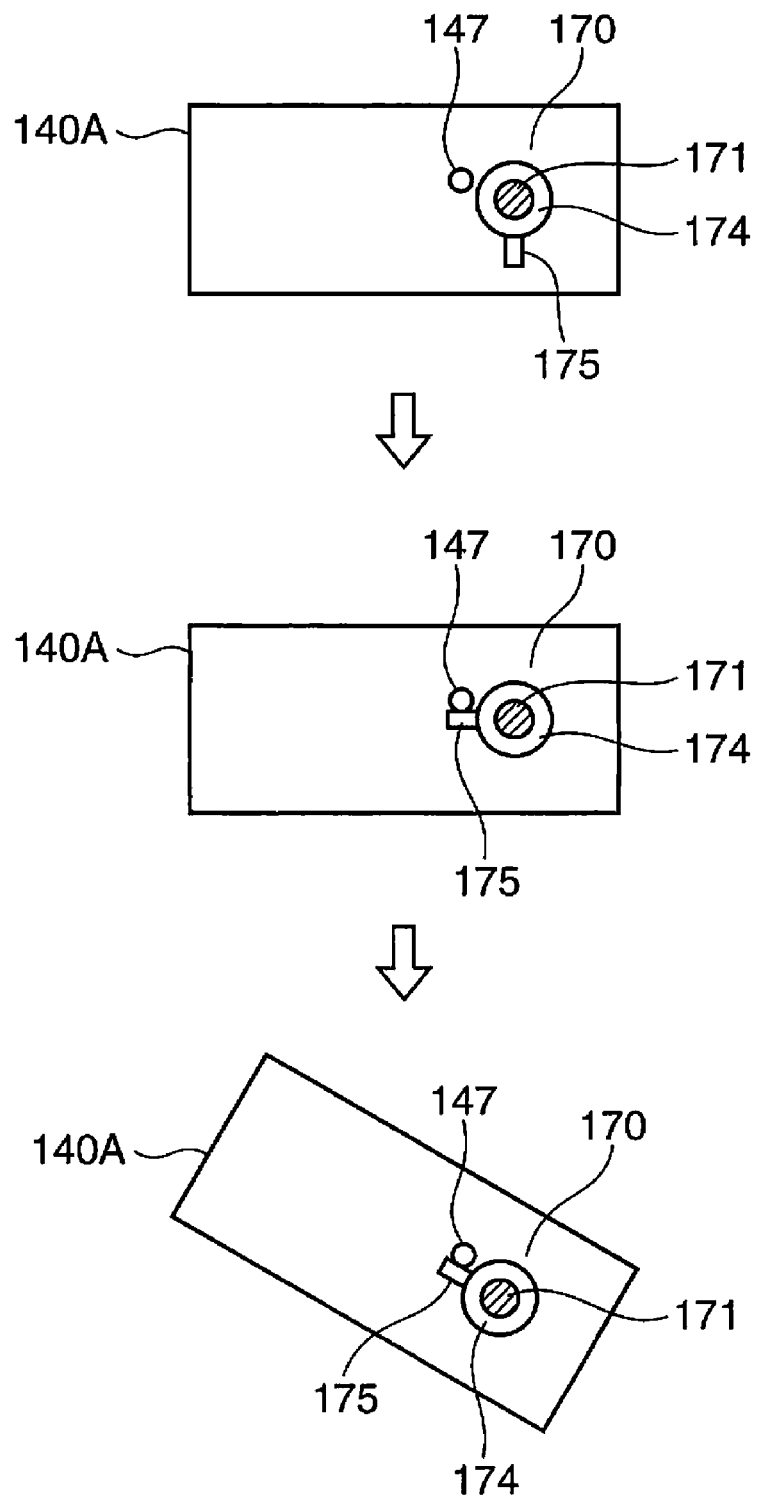
FIG. 9 is a diagram schematically showing an operation performed by the adjustment mechanism shown in FIG. 8.

FIG. 9 is a schematic side view (a side view in the direction of line A-A shown in FIG. 7) of the projector 140A shown in FIG. 8. Cooperative motion between the adjustment mechanism 170 and the projector 140A is further described referring to FIGS. 7 through 9. The upper diagram in FIG. 9 schematically shows the adjustment mechanism 170 in the first position. The middle diagram in FIG. 9 shows the adjustment mechanism 170 when the projector 140A is about to rotate. The lower diagram in FIG. 9 shows the adjustment mechanism 170 when the second housing 130A is further rotated with respect to the first housing 120A.

The first pin 175 of the ring member 174 projects downward, when the second housing 130A is in the first position. As the shaft 171 is rotated by 90° with the rotation of the second housing 130A, (in other words, the second housing 130A stands upright with respect to the first housing 120A), the first pin 175 is abutted against the second pin 147 of the projector 140A. When the second housing 130A is further rotated with respect to the first housing 120A so that the angle between the first housing 120A and the second housing 130A becomes obtuse, the first pin 175 pushes the projector 140A upward by way of the second pin 147. As a result of the above operation, the projector 140A is rotated around the shaft 171. Thus, the second housing 130A standing upright with respect to the first housing 120A is further cooperatively rotated in the back side direction, whereby the projector 140A is rotated with respect to the first housing 120A.

Figure 10:
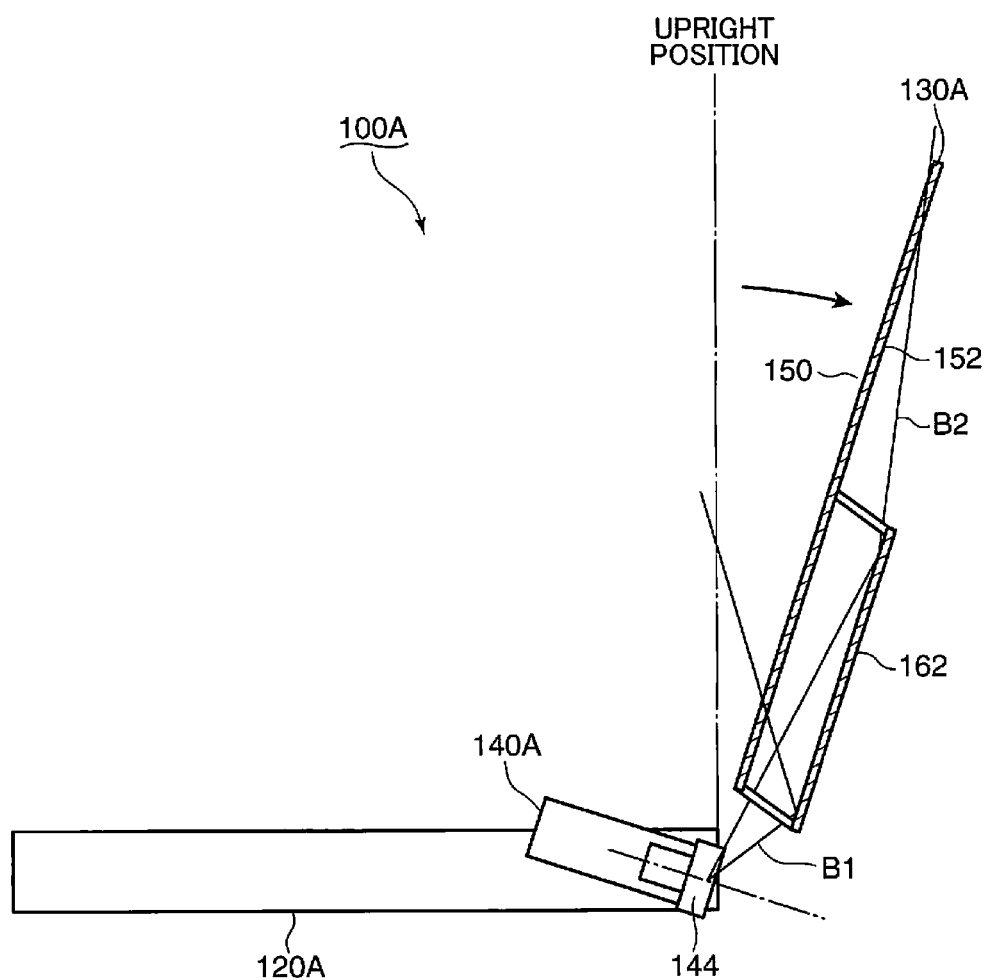
FIG. 10 is a schematic side view of a personal computer configured to display an image by image light along an optical path adjusted by the operation of the adjustment mechanism shown in FIG. 9.

FIG. 10 is a schematic side view of the personal computer 100A provided with the projector 140A shown in the lower diagram in FIG. 9. Cooperative motion between the second housing 130A and the projector 140A is described referring to FIGS. 9 and 10.

The positions and/or the lengths of the first pin 175 and the second pin 147 are determined so that the incident angle of the light (a light beam B1 and a light beam B2 emitted from the projection lens 144) with respect to a mirror element 162 is kept substantially constant by the cooperative motion between the second housing 130A and the projector 140A while the second housing 130A is rotated in the back side direction from an upright position where the second housing 130A stands upright with respect to the first housing 120A. Further, the reflection angle by the mirror element 162 is also kept substantially constant because the incident angles of the light beam B1 and the light beam B2 emitted from the projection lens 144 are substantially kept constant.

The positional relationship between the mirror element 162 and the screen 150 is kept substantially constant while the second housing 130A is rotated with respect to the first housing 120A in the back side direction from the upright position where the second housing 130A stands upright with respect to the first housing 120A. Accordingly, the incident angle of the reflection light (the light beam B1 and the light beam B2 reflected on the mirror element 162) with respect to a second surface 152 of the screen 150 is kept substantially constant. Thus, the user's manipulation for adjusting the angle of the screen 150 is less likely to affect qualities of an image on the screen 150.

In this embodiment, it is preferable to adjust the mirror element 162 and the projector 140A so as to minimize distortion of an image on the screen 150 when the second housing 130A and the screen 150 are in the upright positions. As described above, a high-quality image is maintained on the screen 150 while the user adjusts the angle of the screen 150.

Generally, the angle of the screen 150 inclined in the front side direction from the upright position is not preferable for image observation. Accordingly, as far as the first pin 175 is not contacted with the second pin 147, light emission from the projector 140A may be suspended.

In this embodiment, when the second housing 130A is in the upright position, the first pin 175 is contacted with the second pin 147. Alternatively, as far as the user can observe an image on the screen 150, the first pin 175 may be contacted with the second pin 147 when the second housing 130A is inclined in the back side direction or the front side direction from the upright position with a predetermined angle with respect to the first housing 120A.

Third Embodiment

Figure 11:
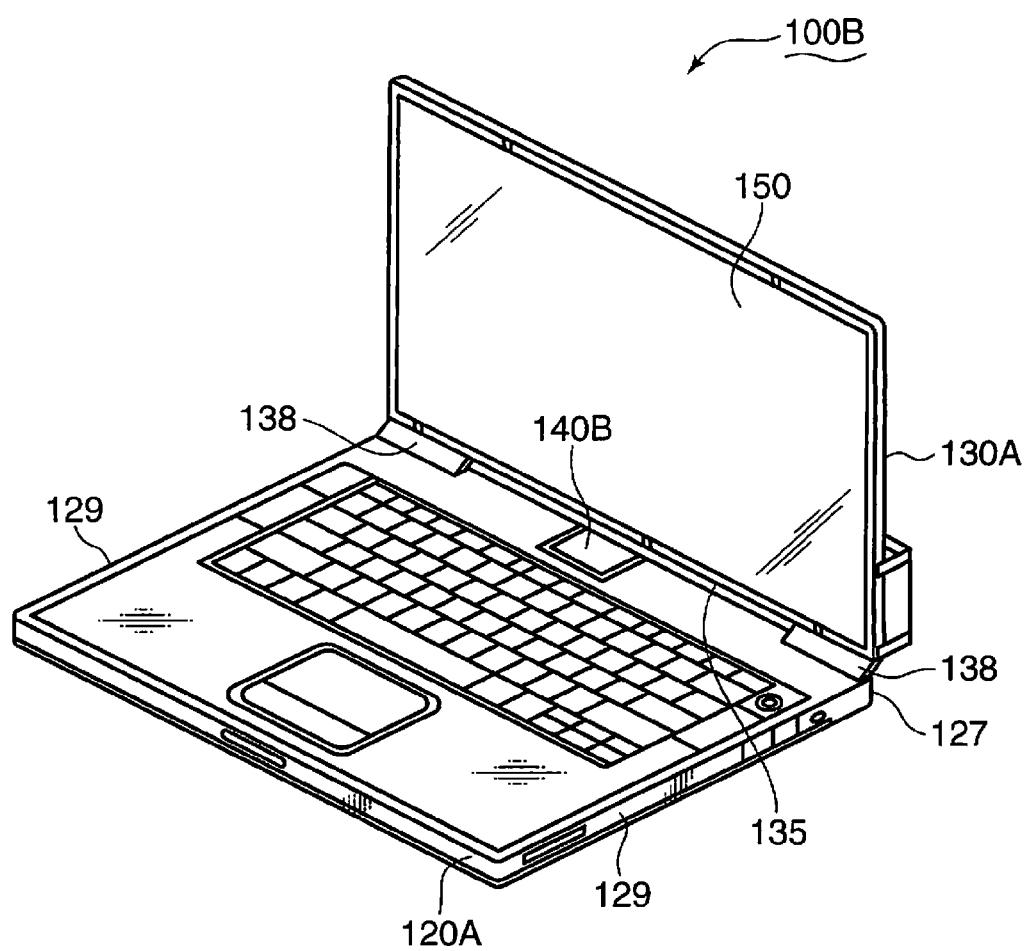
FIG. 11 is a schematic perspective view of a personal computer exemplified as an information processor in accordance with a third embodiment of the invention.
Figure 12:
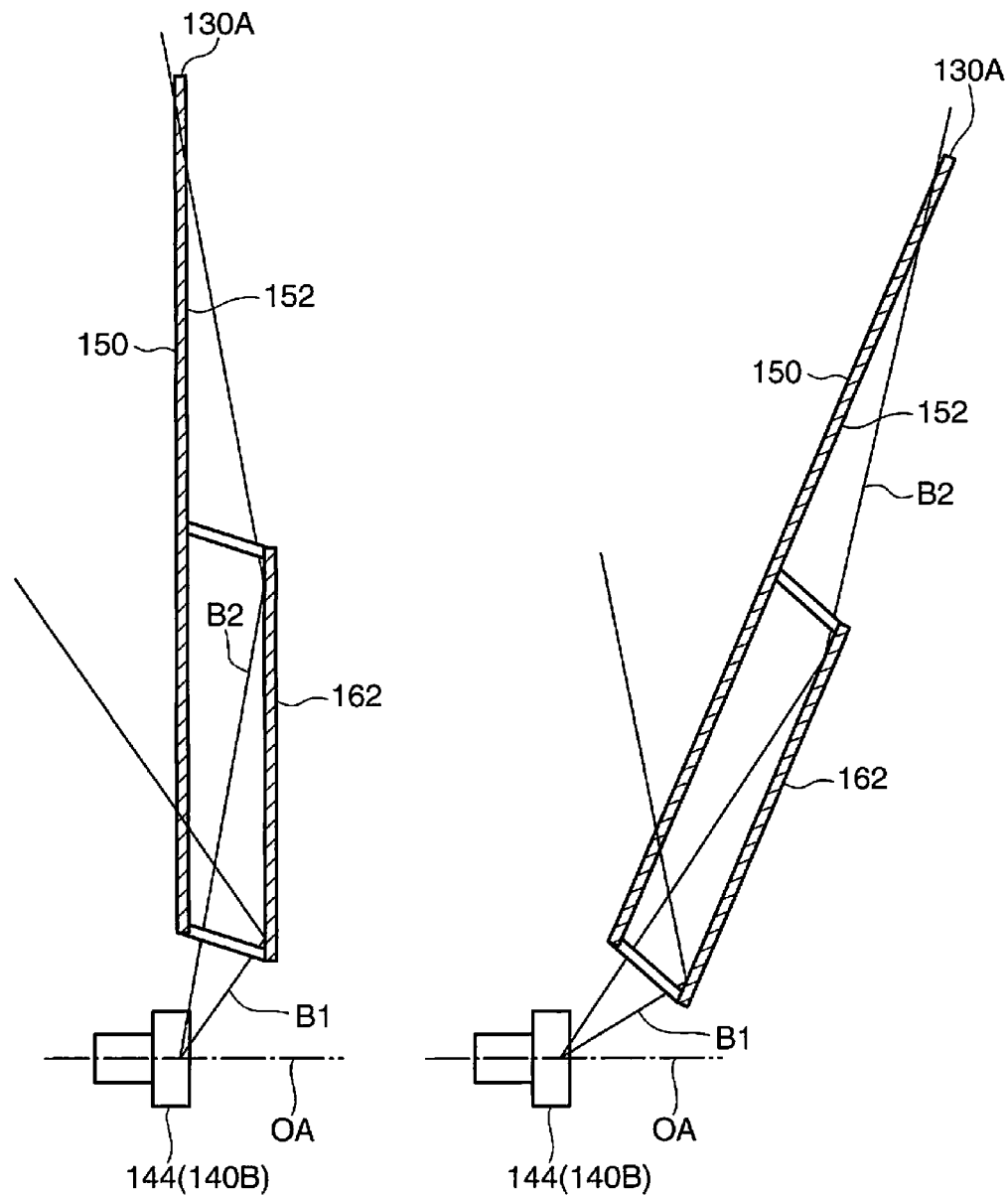
FIG. 12 is a diagram schematically showing an optical path adjustment performed by the personal computer shown in FIG. 11.

FIG. 11 is a schematic perspective view of a personal computer exemplified as an information processor in accordance with the third embodiment of the invention. FIG. 12 is a diagram schematically showing an optical path adjustment performed by the personal computer in accordance with the third embodiment. Like elements as those in the first embodiment and/or the second embodiment are indicated with like elements. Different features from those in the first embodiment and/or the second embodiment are described referring to FIGS. 11 and 12. Description in the first embodiment and/or the second embodiment is appropriately applied to the elements which are not described in the following.

As shown in FIG. 11, a personal computer 100B of the third embodiment is provided with a first housing 120A and a second housing 130A in the same manner as the personal computer 100A of the second embodiment. The first housing 120A and the second housing 130A are properly connected to each other by the connection structure described in the context of the second embodiment. The personal computer 100B is provided with a projector 140B. The disposition of the projector 140B in the first housing 120A is the same as the projectors 140 and 140A described in the context of the first embodiment and the second embodiment.

The left diagram in FIG. 12 shows the second housing 130A in an upright position. The right diagram in FIG. 12 shows the second housing 130A inclined in the back side direction from the upright position. The projector 140B is provided with a projection lens 144 in the similar manner as the projectors 140 and 140A described in the context of the first embodiment and the second embodiment. In this embodiment, the angle between an optical axis OA of the projection lens 144 and an optical path of light (a light beam B1 and a light beam B2) to be emitted from the projection lens 144 is adjusted in accordance with a tilt angle of the second housing 130A. The angles between the optical axis OA of the projection lens 144 and the optical paths of the light beam B1 and B2 are adjusted so that the incident angles of the light beams B1 and B2 with respect to a mirror element 162 are kept substantially constant while the second housing 130A is inclined in the back side direction from the upright position with a predetermined angle. As a result of the above operation, a high-quality image (e.g. an image with less distortion) is displayed on a screen 150 without depending on the tilt angle of the second housing 130A.

Figure 13:
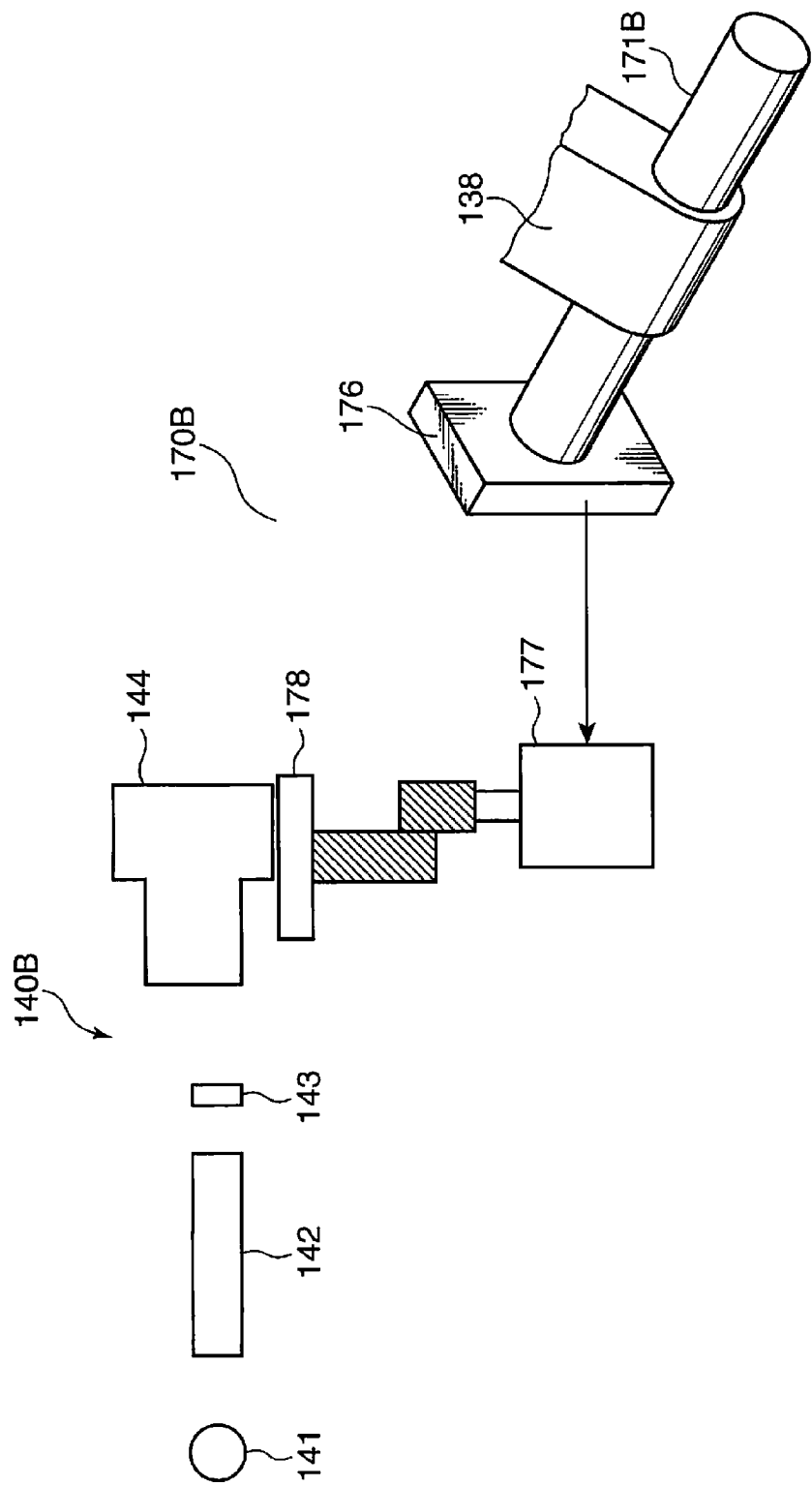
FIG. 13 is a schematic diagram of an adjustment mechanism configured to perform the optical path adjustment shown in FIG. 12.

FIG. 13 is a diagram for schematically showing an adjustment mechanism configured to adjust the optical path described referring to FIG. 12. The adjustment mechanism is described referring to FIGS. 11 through 13.

An adjustment mechanism 170B is provided with a shaft 171B to which protrusion pieces 138 of the second housing 130A are integrally connected. Unlike the shaft 171 described in the context of the second embodiment, an end of the shaft 171B is connected to an encoder 176 configured to detect a rotation angle of the shaft 171B.

The adjustment mechanism 170B is provided with a stepping motor 177 in addition to the encoder 176. The stepping motor 177 is electrically connected to the encoder 176. The stepping motor 177 is rotated in accordance with the rotation angle of the shaft 171B to be outputted from the encoder 176.

The adjustment mechanism 170B is provided with a stage 178 on which the projection lens 144 of the projector 140B is disposed. The stage 178 is mechanically connected to the stepping motor 177. The stage 178 is vertically moved in accordance with rotation of the stepping motor 177.

The projector 140B is provided with a light source 141, an optical element group 142 and a modulation element 143 in addition to the projection lens 144, in the similar manner as the projectors 140 and 140A described in the context of the first embodiment and the second embodiment. An optical path defined from the light source 141 to the modulation element 143 is independent from vertical movement of the stage 178.

Figure 14:
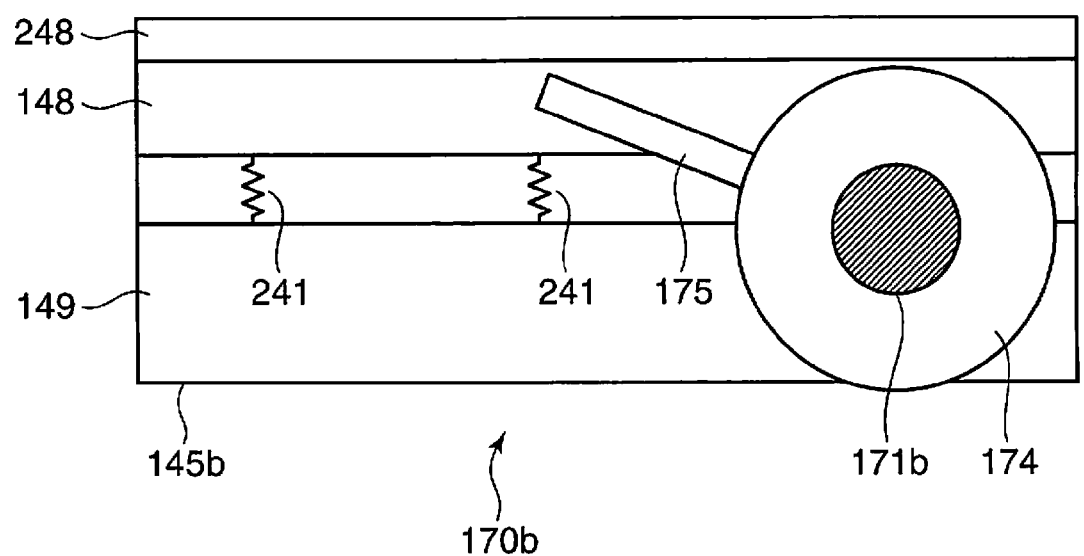
FIG. 14 is a schematic diagram of another adjustment mechanism configured to perform the optical path adjustment shown in FIG. 12.
Figure 15:
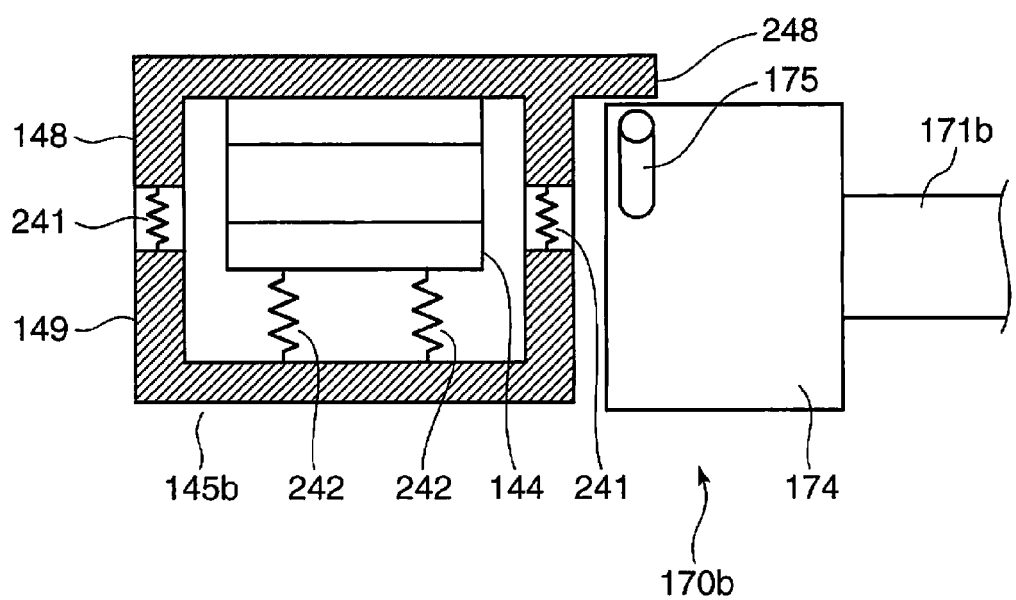
FIG. 15 is a schematic cross-sectional view of the adjustment mechanism shown in FIG. 14.

FIGS. 14 and 15 are diagrams for schematically showing another adjustment mechanism configured to vertically move the projection lens 144. FIG. 14 is a side view of the projector 140B. FIG. 15 is a front view of the adjustment mechanism. The adjustment mechanism is described referring to FIGS. 11, 14, and 15.

An adjustment mechanism 170b is provided with a shaft 171b to which the protrusion pieces 138 of the second housing 130A are integrally connected. The adjustment mechanism 170b is provided with the ring members 174 described in the context of the second embodiment. The ring member 174 including a first pin 175 is attached to an end of the shaft 171b in proximity to the projector 140B.

When the adjustment mechanism 170b shown in FIGS. 14 and 15 is used, the projector 140B may be provided with a shell 145b. The shell 145b includes an upper shell member 148 and a lower shell member 149 disposed below the upper shell member 148. The shell 145b includes a first resilient member 241 configured to connect the upper shell member 148 and the lower shell member 149. The first resilient member 241 urges the upper shell member 148 and/or the lower shell member 149 in such a direction as to move the upper shell member 148 and the lower shell member 149 close to each other.

The upper shell member 148 includes a rib 248 extending above the ring members 174. The rib 248 extends along an outer edge of the upper shell member 148. When the shaft 171b is rotated to revolve the first pin 175 upward, the first pin 175 is contacted with the rib 248. As a result of the above operation, the upper shell member 148 is pushed upward to move away from the lower shell member 149. When the shaft 171b is rotated to revolve the first pin 175 downward, the first pin 175 is moved away from the rib 248. As a result of the above operation, the first resilient member 241 moves the upper shell member 148 toward the lower shell member 149.

Similarly to the shell 145 described in the context of the second embodiment, the shell 145b accommodates therein optical elements such as the light source 141, the optical element group 142, the modulation element 143 and the projection lens 144. FIG. 15 shows the projection lens 144 accommodated in the shell 145b. The shell 145b is provided with a second resilient member 242 configured to support the projection lens 144. The second resilient member 242 urges the projection lens 144 toward the upper shell member 148.

As described above, when the upper shell member 148 is moved away from the lower shell member 149 by the first pin 175, the second resilient member 242 pushes the projection lens 144 upward. The first resilient member 241 pushes the projection lens 144 downward along with the upper shell member 148 when the first pin 175 revolves downward. The optical path defined from the light source 141 to the modulation element 143 is independent from vertical movement of the projection lens 144.

In this embodiment, the projection lens 144 is vertically moved, using the electrical and/or the mechanical mechanism described referring to FIGS. 13 through 15. Alternatively, another electrical and/or mechanical structure configured to vertically move the projection lens 144 may be applied to the adjustment mechanism 170B, 170b.

FIG. 16 is a schematic side view showing the optical elements of the projector 140B to be operated by one of the adjustment mechanisms 170B and 170b described referring to FIGS. 13 through 15. The upper diagram in FIG. 16 shows the projection lens 144 moved away from the optical path defined between the light source 141 and the modulation element 143. The lower diagram in FIG. 16 shows the projection lens 144 moved toward the optical path defined between the light source 141 and the modulation element 143. A relationship between the distance between the optical path defined from the light source 141 to the modulation element 143 and the projection lens 144; and a light beam to be emitted from the projection lens 144 is described referring to FIGS. 11 through 16.

As described above, the projector 140B is provided with the light source 141, the optical element group 142, the modulation element 144 and the projection lens 144. Similarly to the first embodiment and the second embodiment, the modulation element 143 forms an image to be projected as image light under control of a video circuit configured to process an image signal. Further, the light source 141 emits light toward the modulation element 143 to define an optical path OP. The light from the light source 141 is adjusted through the optical element group 142, and then impinges on the modulation element 143, which then modulates the light from the light source 141. The light (image light) transmitted through the modulation element 143 impinges on the projection lens 144, which then enlarges and emits the transmitted light (image light).

As described above, the adjustment mechanism 170B, 170b vertically moves the projection lens 144. As a result of the above operation, the vertical distance (the distance between the modulation element 143 and the optical path OA) between the optical path OP and the optical axis OA of the projection lens 144 increases/decreases. In the case where the distance between the optical path OP and the optical axis OA is increased (see the upper diagram in FIG. 16), the angle between the light beam B to be emitted from the projection lens 144 and the optical axis OA is increased. In the case where the distance between the optical path OP and the optical axis OA is decreased (see the lower diagram in FIG. 16), the angle between the light beam B to be emitted from the projection lens 144 and the optical axis OA is decreased. Thus, the adjustment mechanism 170B, 170b properly adjusts the distance between the optical axis OA and the optical path OP in accordance with the tilt angle of the second housing 130A which is rotated with respect to the first housing 120A, whereby the incident angle with respect to a second surface 152 of the screen 150 is kept substantially constant.

In this embodiment, the distance between the optical axis OA and the optical path OP is adjusted by vertical movement of the projection lens 144. Preferably, the vertical movement of the projection lens 144 is started from a position where the principal point of the projection lens 144 on the image side is aligned with the rotational center (e.g. the shaft 171B, 171b) of the screen 150. Alternatively, the light source 141, the optical element group 142 and/or the modulation element 143, which define the optical path OP, may integrally effect vertical movement.

Fourth Embodiment

Figure 17:
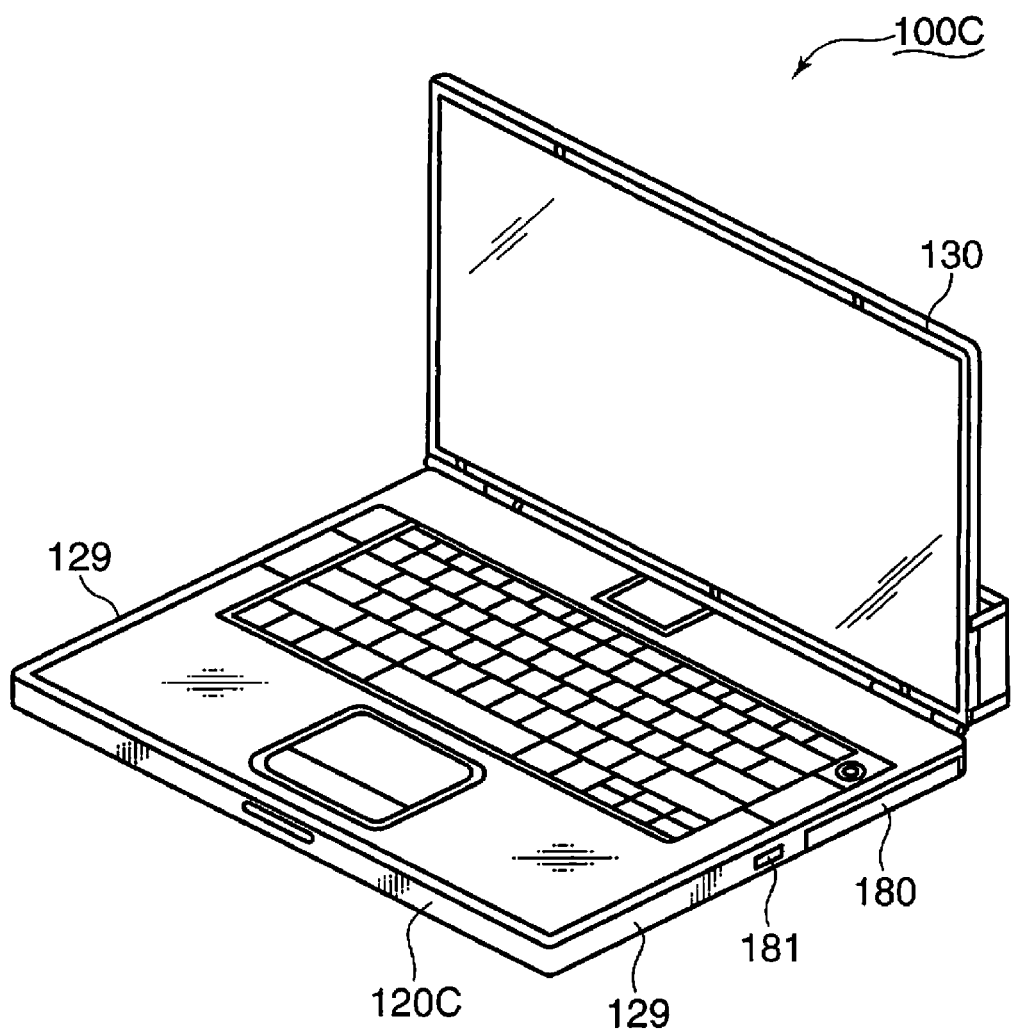
FIG. 17 is a schematic perspective view of a personal computer exemplified as an information processor in accordance with a fourth embodiment of the invention.

FIG. 17 is a schematic perspective view of a personal computer exemplified as an information processor in accordance with the fourth embodiment. Like elements as those in the first embodiment and/or the third embodiment are indicated with the elements. Different features from those in the first embodiment and/or the third embodiment are described referring to FIG. 17. Description in the first embodiment and/or the third embodiment is appropriately applied to the elements which are not described in the following.

A personal computer 100C according to the fourth embodiment is provided with a first housing 120C and a second housing 130. The structure described in the context of the first embodiment is appropriately applied to connection between the first housing 120C and the second housing 130.

The personal computer 100C is provided with a table 180 accommodated in the first housing 120C and an eject mechanism configured to expose the table 180 to the exterior of the first housing 120C. In FIG. 17, the table 180 appears on a right side wall 129 of the first housing 120C. A well-known mechanism configured to eject and retract a table on which a storage medium such as a CD or a DVD is loaded may be applied to the eject mechanism.

For instance, the user is allowed to push a button 181 disposed on the right side wall 129 of the first housing 120C to expose the table 180 to the exterior of the first housing 120C. Alternatively, the user is allowed to operate the personal computer 100C to activate a program for exposing the table 180 to the exterior of the first housing 120C in order to expose the table 180 to the exterior of the first housing 120C.

Figure 18:
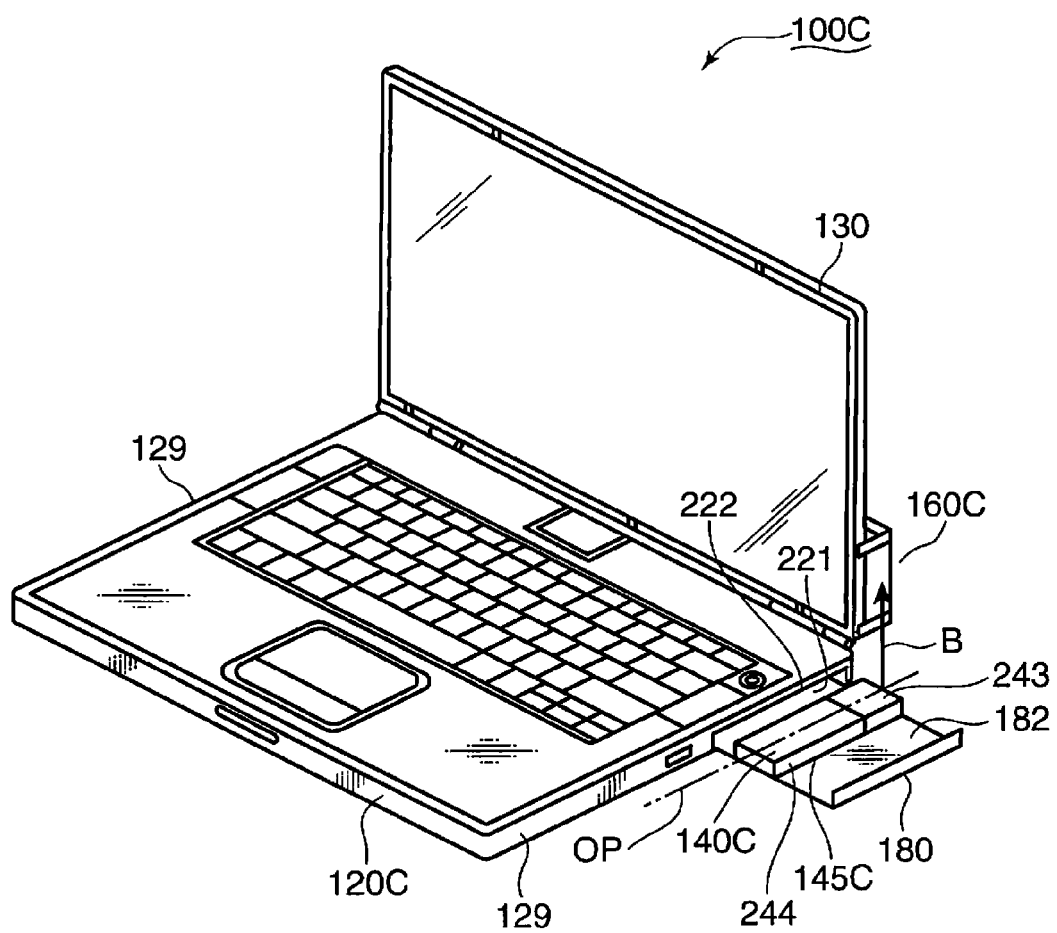
FIG. 18 is a schematic perspective view of the personal computer exemplified as the information processor in accordance with the fourth embodiment.

FIG. 18 is a schematic perspective view of the personal computer 100C provided with the table 180 exposed to the exterior of the first housing 120C. The personal computer 100C is further described referring to FIG. 18.

The personal computer 100C is provided with a projector 140C mounted on the table 180 and a mirror mechanism 160C attached to the back side of the second housing 130. In this embodiment, a top surface 182 of the table 180 is exemplified as a support surface configured to support the projector 140C thereon. Connection between the mirror mechanism 160C and the second housing 130 is realized by the structure described in the context of the first embodiment.

The projector 140C irradiates light (a light beam B) toward the mirror mechanism 160C attached to the back side of the second housing 130. In this embodiment, the light beam B to be emitted from the projector 140C toward the mirror mechanism 160C is horizontally inclined with respect to an optical path OP defined within the projector 140C. Inclination of the light beam B is appropriately adjusted based on the principle described in the context of the third embodiment.

Similarly to the projectors 140, 140A and 140B described in the context of the first through the third embodiments, the projector 140C is provided with a light source 141, an optical element group 142, a modulation element 143 and a projection lens 144 (see e.g. FIG. 16). The tilt angle of the light beam B is properly determined by adjusting the horizontal distance between the optical path OP and the optical axis OA of the projection lens 144.

The projector 140C is provided with a shell 145C. The shell 145C is provided with a first shell member 243 configured to accommodate the projection lens 144 and a second shell member 244 configured to accommodate the light source 141, the optical element group 142 and the modulation element 143. In this embodiment, the first shell member 243 is mounted to be vertically movable with respect to the top surface 182 of the table 180. On the other hand, the second shell member 244 is stably mounted with respect to the top surface 182 of the table 180.

Figure 19:
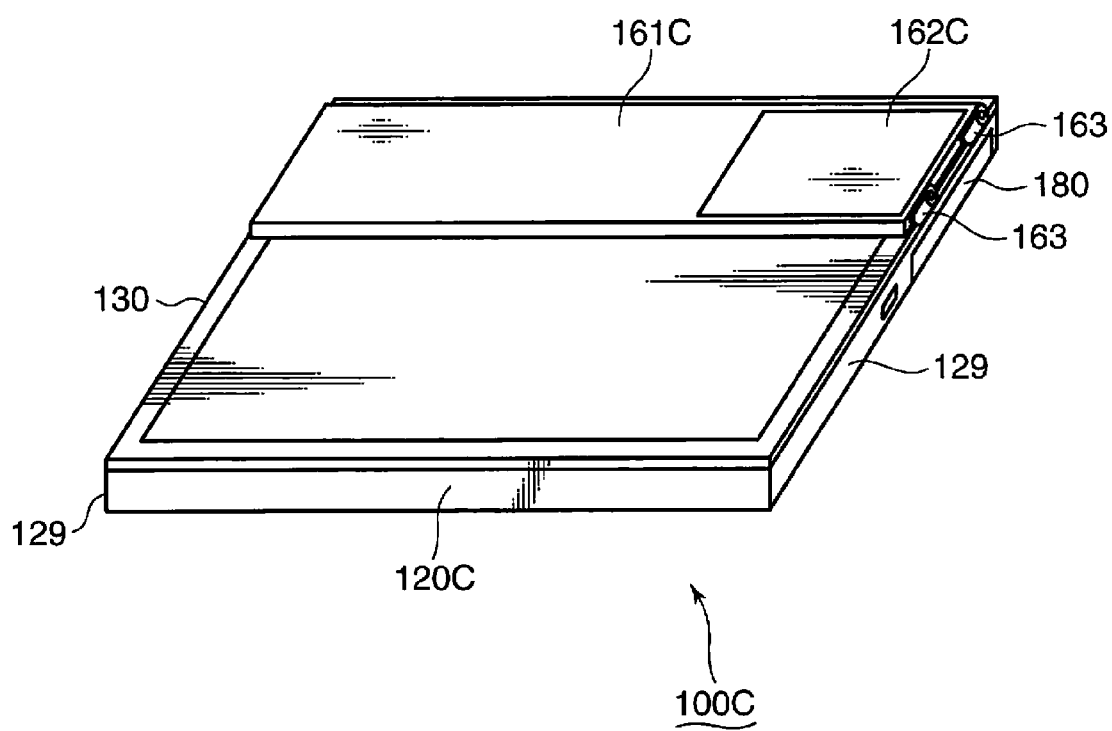
FIG. 19 is a schematic perspective view of the personal computer exemplified as the information processor in accordance with the fourth embodiment.

FIG. 19 is a schematic perspective view of the personal computer 100C provided with the second housing 130 in the first position. The personal computer 100C is further described referring to FIG. 19.

The mirror mechanism 160C is provided with a support plate 161C, a mirror element 162C and a link mechanism 163. In this embodiment, as described above, the mirror element 162C is supported near a right end of the support plate 161C because the table 180 protrudes from the right side wall 129 of the first housing 120C. In the case where the table 180 protrudes from a left side wall 129 of the first housing 120C, preferably, the mirror element 162C is supported near a left end of the support plate 161C.

FIG. 20 is a schematic cross-sectional view of a support mechanism configured to support the first shell member 243. The upper diagram in FIG. 20 schematically shows the personal computer 100C provided with the table 180 exposed to the exterior of the first housing 120C. The lower diagram in FIG. 20 schematically shows the personal computer 100C provided with the table 180 in motion in a direction to be accommodated in the first housing 120C. The support mechanism is described referring to FIGS. 18 through 20.

The personal computer 100C is provided with a support mechanism 190 configured to resiliently support in cooperation with the table 180 the first shell member 243 for accommodating the projection lens 144. The support mechanism 190 is disposed between the top surface 182 of the table 180 and the first shell member 243. When the aforementioned eject mechanism exposes the table 180 to the exterior of the first housing 120C, the support mechanism 190 configured to upwardly urge the first shell member 243 moves the first shell member 243 away from the top surface 182 of the table 180.

The first housing 120C includes an upper edge 222 defining the upper boundary of an opening 221 for receiving the table 180 therein. The first shell member 243 includes a slope 245 confronting the opening 221 and/or the upper edge 222. When the table 180 is moved in the direction to be housed in the first housing 120C, the slope 245 is contacted with the upper edge 222 of the first housing 120C. The contact between the slope 245 and the upper edge 222 causes compression of the support mechanism 190. As a result of the above operation, the first shell member 243 is moved toward the top surface 182 of the table 180, so that the first shell member 243 is properly housed in the first housing 120C. The projection lens 144 stably supported within the first shell member 243 is moved away from and toward the table 180 in response to vertical movement of the first shell member 243.

As described above, the mirror element 162C is connected to the second housing 130 disposed at an upper position than the first housing 120C. Accordingly, the light beam B to be emitted from the projection lens 144 is inclined upwardly with respect to the optical path OP defined within the projector 140C. The distance between the first shell member 243 on the table 180 exposed to the exterior of the first housing 120C and the top surface 182 of the table 180 is properly set so that the light beam B emitted from the projection lens 144 is directed toward the mirror element 162.

Alternatively, another mechanism configured to support the projection lens 144 to be vertically movable with respect to the support mechanism 190 may be used. For instance, it is possible to provide the support mechanism 190 with a mechanism including a support block configured to support the projection lens 144 and a drive source configured to vertically move the support block (see e.g. FIG. 13). For instance, the drive source may vertically move the projection lens 144 in response to a control signal to be transmitted resulting from an operation of the eject mechanism of the personal computer 100C as well as rotation of the second housing 130.

Fifth Embodiment

Figure 21:
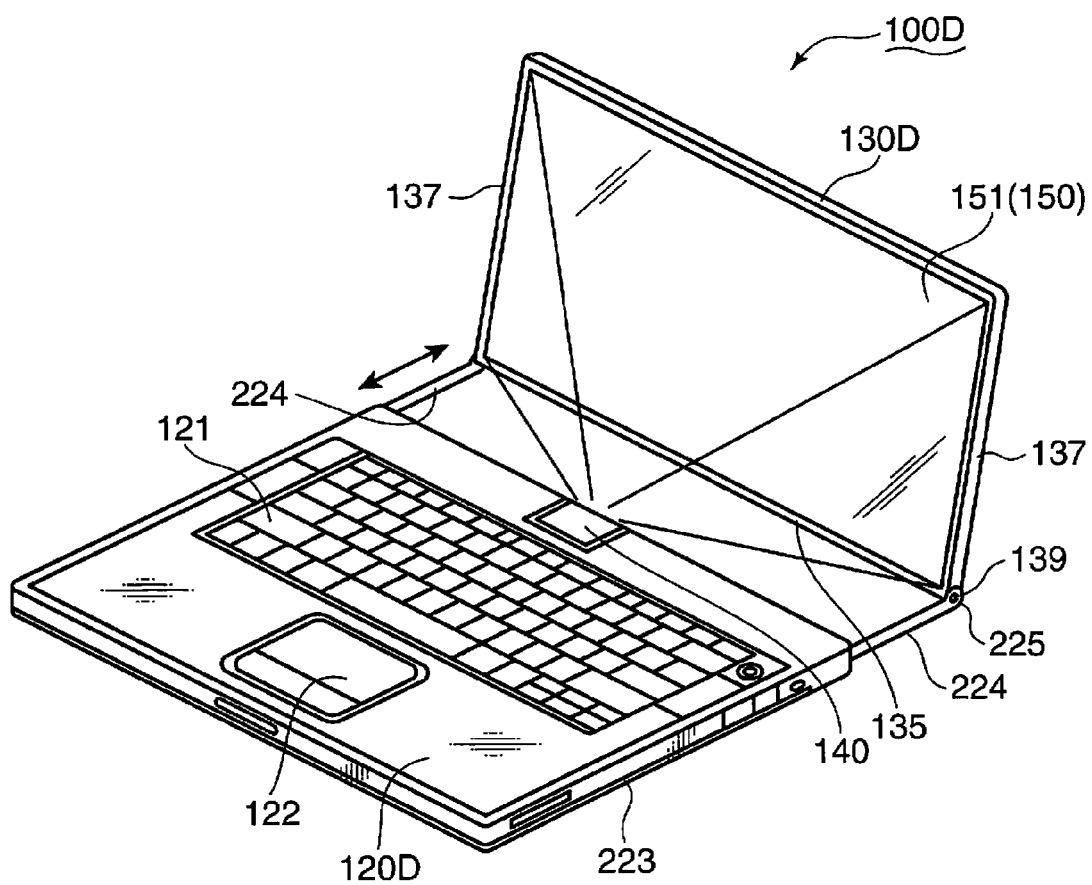
FIG. 21 is a schematic perspective view of a personal computer exemplified as an information processor in accordance with a fifth embodiment of the invention.

FIG. 21 is a schematic perspective view of a personal computer exemplified as an information processor in accordance with the fifth embodiment. Like elements as in the first embodiment are indicated with like reference numerals. Different features from those in the first embodiment are described referring to FIG. 21. Description in the first embodiment is appropriately applied to the elements which are not described in the following.

A personal computer 100D according to the fifth embodiment is provided with a first housing 120D and a second housing 130D. The first housing 120D includes a main body 223 configured to accommodate elements for processing information inputted through keys 121 and a touch pad 122, and rods 224 configured to displace between a retracted position where the rods 224 are retracted in the main body 223 and a protruded position where the rods 224 are protruded from the main body 223. In this embodiment, a top surface 123 of the main body 223 on which the keys 121 and the touch pad 122 are disposed is exemplified as an input surface.

Each of the rods 224 includes a support end 225 configured to rotatably support the second housing 130D and a base end opposite to the support end 225. The base end of the rod 224 is consistently housed in the first housing 120D. The support end 225 is connected to an end of a side edge 137 intersecting with a base end edge 135 of the second housing 130D. The second housing 130D is provided with a generally cylindrical column-shaped protrusion 139 protruding from the end of the side edge 137 intersecting with the base end edge 135. An opening complementary to the projection 139 is defined in the support end 225. The projection 139 is fitted in the opening of the support end 225, so that the second housing 130D is rotatably connected to the support end 225.

The user is allowed to rotate the second housing 130D to the first position after displacing the rods 224 to the retracted position. As a result of the above operation, the personal computer 100D is properly folded.

A projector 140 is attached to the first housing 120D. The disposition of the projector 140 is substantially the same as in the first embodiment. The user is allowed to rotate the second housing 130D toward the second position after displacing the rods 224 to the protruded position. As a result of the above operation, a distance long enough to spread image light emitted from the projector 140 over the entirety of a first surface 151 of a screen 150 attached to the second housing 130D is secured.

In this embodiment, preferably, the screen 150 specifically reflects a light component of a specific wavelength. For instance, in the case where the light source 141 of the projector 140 projects light (image light) with a red light component, a green light component and a blue light component toward the first surface 151 of the screen 150, the screen 150 may reflect the red light component, the green light component and the blue light component with a larger amount than a light component with another hue. As a result of the above operation, the user is allowed to observe a clearer image.

Unlike the personal computers 100, 100A, 100B, and 100C described in the context of the first through the fourth embodiments, the personal computer 100D according to this embodiment is operable to display an image on the screen 150 without using the mirror mechanism 160, 160C. Accordingly, the personal computer 100D is produced with a smaller number of parts. This contributes to reduction in the production cost. Further, the user is allowed to change the protrusion length of the rods 224 with respect to the main body 223 to adjust an image size on the screen 150.

Sixth Embodiment

Figure 22:
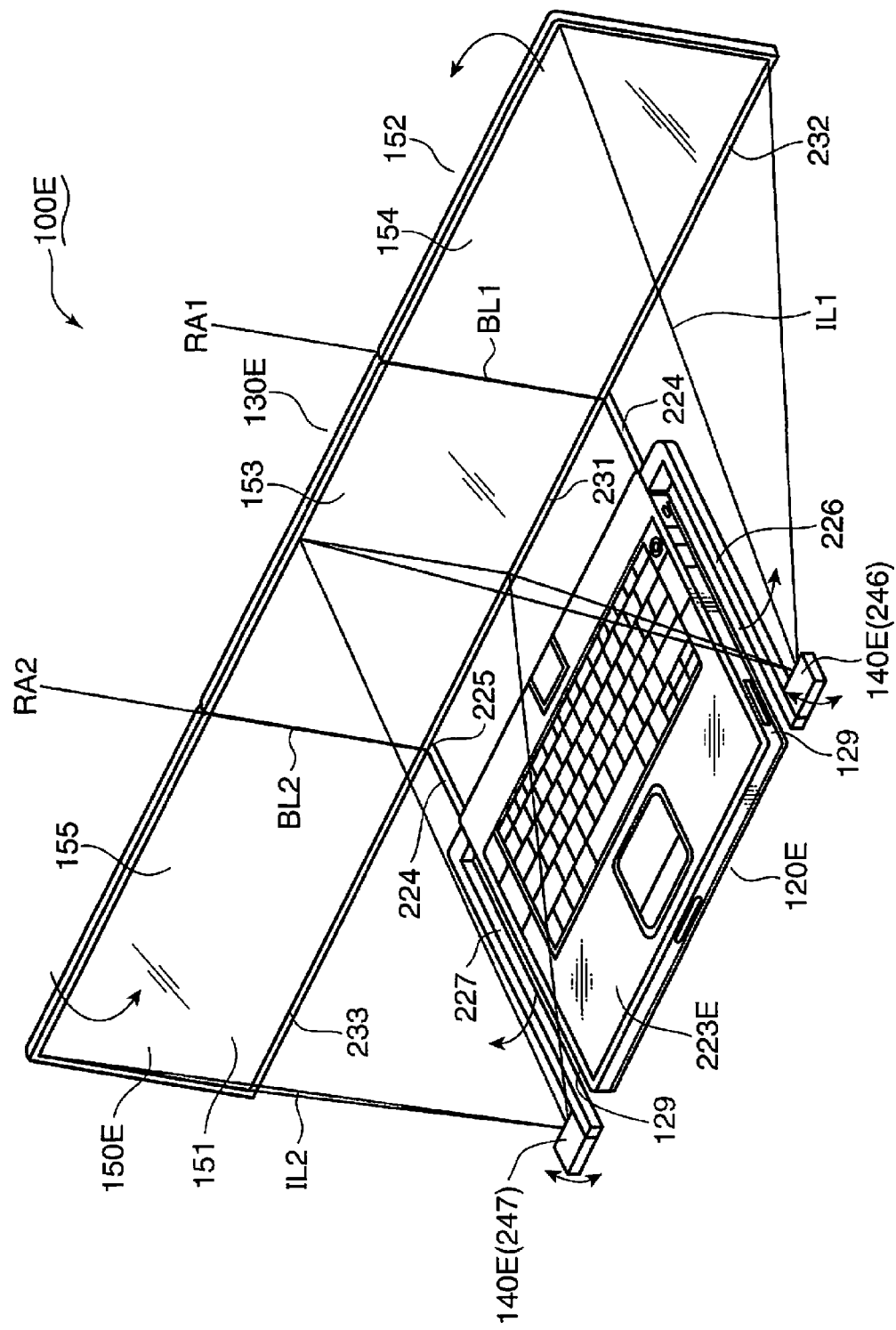
FIG. 22 is a schematic perspective view of a personal computer exemplified as an information processor in accordance with a sixth embodiment of the invention.

FIG. 22 is a schematic perspective view of a personal computer exemplified as an information processor in accordance with the sixth embodiment. Like elements as in the fifth embodiment are indicated with like reference numerals. Different features from those in the fifth embodiment are described referring to FIG. 22. Description in the fifth embodiment is appropriately applied to the elements which are not described in the following.

A personal computer 100E according to the sixth embodiment is provided with a first housing 120E and a second housing 130E. Similarly to the fifth embodiment, the second housing 130E is rotatably connected to the first housing 120E by way of rods 224.

A screen 150E is attached to the second housing 130E. The screen 150E includes a first screen 153 between the paired left and right rods 224, a second screen 154 adjacent to the right of the first screen 153 and a third screen 155 adjacent to the left of the first screen 153.

The second housing 130E includes a first frame 231 on which the first screen 153 is attached, a second frame 232 on which the second screen 154 is attached and a third frame 233 on which the third screen 155 is attached. The first frame 231 is directly supported by the paired left and right rods 224. The first frame 231 is rotatably connected to support ends 225 of the rods 224.

The personal computer 100E is provided with a projector 140E. The projector 140E includes a first projector 246 adjacent to a right side wall 129 of the first housing 120E and a second projector 247 adjacent to a left side wall 129 of the first housing 120E. When the second housing 130E is in the second position, a borderline BL1 between the first screen 153 and the second screen 154 and/or a borderline BL2 between the first screen 153 and the third screen 155 defines a height dimension of a projection area for light to be projected from the projector 140E.

The second frame 232 is rotatably connected to the first frame 231 by way of e.g. a hinge element (not shown). The hinge element between the first frame 231 and the second frame 232 defines a rotational axis RA1 beside a second surface 152 of the screen 150E. The second frame 232 is rotated in the back side direction around the rotational axis RA1 along the borderline BL1 between the first screen 153 and the second screen 154. As a result of the above operation, the second screen 154 is folded on the back side of the first screen 153.

Similarly to the second frame 232, the third frame 233 is rotatably connected to the first frame 231 by way of a hinge element (not shown). The hinge element between the first frame 231 and the third frame 233 defines a rotational axis RA2 beside a first surface 151 of the screen 150E. The second frame 232 is rotated in the front side direction around the rotational axis RA2 along the borderline BL2 between the first screen 153 and the third screen 155. As a result of the above operation, the third screen 155 is folded on the front side of the first screen 153.

Alternatively, the second screen 154 and/or the third screen 155 may be folded on the first screen 153 by using another structure. For instance, the second frame 232 and/or the third frame 233 may be connected to the first frame 231 by a rail structure. The user may displace the second frame 232 and/or the third frame 233 with respect to the first frame 231 in front side direction or back side direction, and then move the second frame 232 and/or the third frame 233 toward the first frame 231. As a result of the above operation, the second screen 154 and/or the third screen 155 is properly folded over the first screen 153.

As described above, the user is allowed to fold the second screen 154 and the third screen 155 with respect to the first screen 153 and then retract the rods 224 into the first housing 120E. Thereafter, the user is allowed to rotate the second housing 130E toward the first position. As a result of the above operation, the personal computer 100E is properly folded. In performing the above operation, the screen 150E may serve as a cover. In this configuration, each area of the first screen 153, the second screen 154 and the third screen 155 may be preferably substantially equal to the area of the top surface 123 of the first housing 120E.

In the case where the user expands the second housing 130E after protruding the rods 224 from the first housing 120E, the screen 150E provides a display area on which image light from the projector 140E is displayed as an image. The first projector 246 projects image light IL1 onto the second screen 154 and a right area of the first screen 153. The second projector 247 projects image light IL2 onto the third screen 155 and a left area of the first screen 153. In this embodiment, the image light IL1 from the first projector 246 is exemplified as first light to be projected onto the second screen 154 and a part of the first screen 153 while the image light IL2 from the second projector 247 is exemplified as second light to be projected onto the third screen 155 and another part of the first screen 153. Thus, the first projector 246 and the second projector 247 are operable to properly project the image light IL1 and the image light IL2 onto the second screen 154, the third screen 155, and the first screen 153 disposed between the second screen 154 and the third screen 155.

The first housing 120E is provided with a generally L-shaped first arm 226 configured to support the first projector 246 and a generally L-shaped second arm 227 configured to support the second projector 247. The first arm 226 and the second arm 227 respectively include pivot ends to be pivotally connected to the first housing 120E.

The first housing 120E includes a main body 223E to be pivotally connected to the first arm 226 and the second arm 227. The respective pivot ends of the first arm 226 and the second arm 227 shown in FIG. 22 are received in the main body 223E through the back side ends of the side walls 129 of the first housing 120E.

A lead end of the first arm 226 to be connected to the first projector 246 is disposed between the right side wall 129 of the first housing 120E and the first projector 246. Preferably, the first projector 246 is mounted to rotate up and down with respect to the lead end of the first arm 226. Thus, the user is allowed to adjust the projection position of the image light IL1 by rotating the first projector 246 up and down. Preferably, the first arm 226 may be disposed at a position away from the right side wall 129 of the first housing 120E. Thereby, interference between the first arm 226 and another device to be attached to an input port formed in the right side wall 129 of the first housing 120E is appropriately less like to occur.

A lead end of the second arm 227 to be connected to the second projector 247 is disposed between the left side wall 129 of the first housing 120E and the second projector 247. Preferably, the second projector 247 may be mounted to rotate up and down with respect to the lead end of the second arm 227. Thus, the user is allowed to adjust the projection position of the image light IL2 by rotating the second projector 247 up and down. Preferably, the second arm 227 may be disposed at a position away from the left side wall 129 of the first housing 120E. Thereby, interference between the second aim 227 and another device to be attached to an input port formed in the left side wall 129 of the first housing 120E is appropriately less likely to occur.

Figure 23:
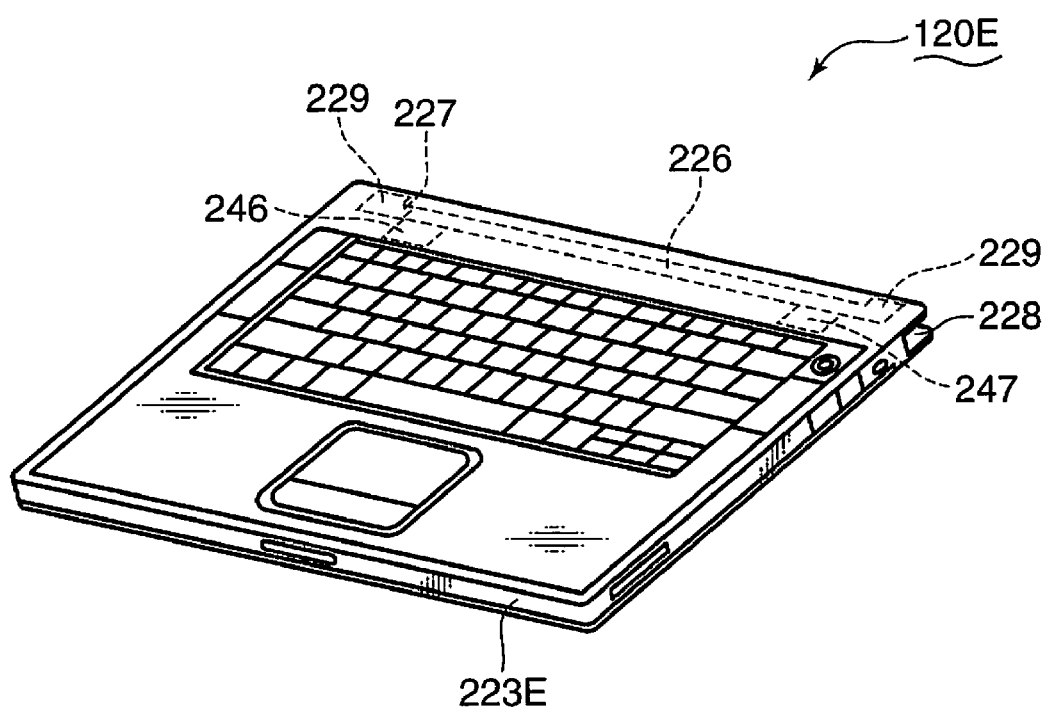
FIG. 23 is a schematic perspective view of a first housing of the personal computer shown in FIG. 22.

FIG. 23 is a schematic perspective view of the first housing 120E in which the first projector 246 and the second projector 247 are accommodated. The first housing 120E is described referring to FIGS. 22 and 23.

A housing recess 228 configured to accommodate the first projector 246 and the second projector 247 is defined in the back surface of the main body 223E of the first housing 120E. The housing recess 228 linearly extends along the back surface of the main body 223E. The respective pivot ends 229 of the first arm 226 and the second arm 227 are disposed in the housing recess 228. The first aim 226 and the second arm 227 are folded one over the other within the housing recess 228.

The user is allowed to pivotally move the first aim 226 and the second aim 227 disposed in the housing recess 228 to set the first projector 246 and the second projector 247 to projection positions where the first projector 246 and the second projector 247 respectively project the image light IL1 and IL2. Further, the user is allowed to pivotally move the first arm 226 and the second arm 227 in the back side direction so that the first arm 226 and the second arm 227 are set to accommodating positions where the first projector 246 and the second projector 247 are respectively accommodated in the housing recess 228.

The second housing 130E of the personal computer 100E according to this embodiment has a foldable structure or a slidable structure. Accordingly, the user is allowed to expand the screen 150E so as to obtain a larger projection area. The projector 140E is operable to project the image light IL1 and IL2 onto the expanded screen 150E to thereby provide the user with a larger image.

The image light IL1 and the image light IL2 may be cooperated with each other to render an image representing one content. Alternatively, the image light IL1 and the image light IL2 may respectively express images representing individual contents The user is allowed to project the image light IL1, IL2 from the projector 140E without expanding the screen 150E. For instance, the user is allowed to project the image light IL1, IL2 onto another screen device provided independently of the personal computer 100E, a wall or a ceiling. Thus, the user is allowed to observe various sizes of images.

The structure for pivotally moving the first aim 226 and the second arm 227 and the rotatable attachment structure for the projector 140E with respect to the first arm 226 and the second aim 227 allow the user to project the image light IL1, IL2 at a desired position without moving the entirety of the personal computer 100E.

In this embodiment, the first screen 153, the second screen 154, and the third screen 155 are horizontally aligned. Alternatively, the first screen 153, the second screen 154 and the third screen 155 may be vertically aligned. Further alternatively, one of the second screen 154 and the third screen 155 may be horizontally aligned with the first screen 153 while the other thereof may be vertically aligned with the first screen 153 as necessary.

In this embodiment, the first screen 153 attached to the first frame 231 directly supported by the rods 224 is disposed between the second screen 154 and the third screen 155. Alternatively, the second screen 154 and the third screen 155 may be disposed continuously in one of the leftward direction, the rightward direction and the upward direction of the first screen 153.

In this embodiment, the first arm 226 and the second arm 227 are pivotally and horizontally moved. Alternatively, the first arm 226 and/or the second arm 227 may be connected to the main body 223E to be pivotally and vertically movable.

In this embodiment, the first projector 246 attached to the first arm 226 and the second projector 247 attached to the second arm 227 are vertically rotated. Alternatively, the first projector 246 and the second projector 247 may be horizontally rotated with respect to the first arm 226 and the second arm 227, respectively.

Seventh Embodiment

A personal computer exemplified as an information processor in accordance with the seventh embodiment is different from those in the first through the sixth embodiments in the feature that a second housing is detachably attached to a first housing. The structure other than the above is substantially the same as in the first through the sixth embodiments.

As described in the context of the first through the sixth embodiments, the personal computers display an image by using a screen. Accordingly, it is not necessary to electrically connect the first housing configured to accommodate elements for information processing with the second housing for displaying an image. In view of this, preferably, the second housing may be formed to be detachable from the first housing.

Figure 24:
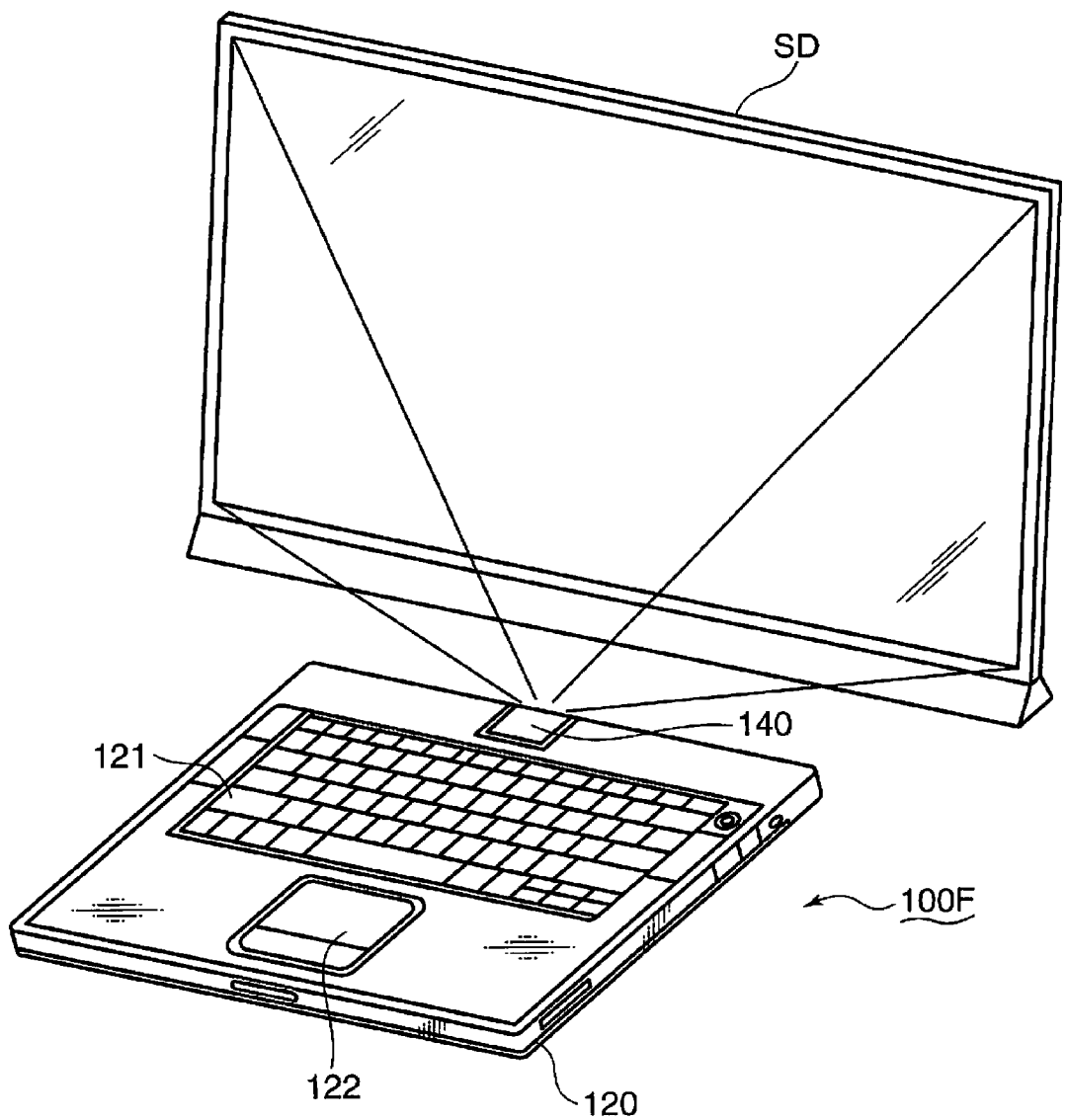
FIG. 24 is a schematic perspective view of a personal computer exemplified as an information processor in accordance with a seventh embodiment of the invention.

FIG. 24 is a schematic perspective view showing a personal computer, wherein the second housing is removed. The personal computer according to the seventh embodiment is described referring to FIG. 24.

A personal computer 100F according to the seventh embodiment is provided with a first housing with substantially the same configuration as in the first embodiment. Accordingly, the first housing of the personal computer 100F shown in FIG. 24 is indicated by the reference numeral 120 which is used in the description of the first embodiment. Alternatively, one of the first housings 120A, 120C, 120D, and 120E described in the second through the sixth embodiments may be incorporated in the personal computer 100F of this embodiment.

As described above, since the second housing is removed, keys 121 and a touch pad 122 of the first housing 120 are uncovered by a second housing and/or a screen. Accordingly, the user is allowed to operate the personal computer 100F while observing an image projected from a projector 140 onto another screen device SD (alternatively a room wall or a ceiling) disposed on the back side of the personal computer 100F. Further, the user is allowed to adjust the distance between the other screen device SD (or a room wall) and the personal computer 100F to observe a desired size of an image.

For instance, the user is allowed to rotate the second housing 130 of the personal computer 100 described in the context of the first embodiment in the back side direction from the first position by about 180° or about 360°, and then, project image light from the projector 140 onto the other screen device SD (or a room wall or a ceiling). Alternatively, the user is allowed to use the second housing 130 rotated from the first position by an angle of 180° or more as a leg portion for retaining an inclined posture of the first housing 120. The user is allowed to adjust the rotation angle of the second housing 130 so as to properly set the projection angle of light from the projector 140.

Eighth Embodiment

Figure 25:
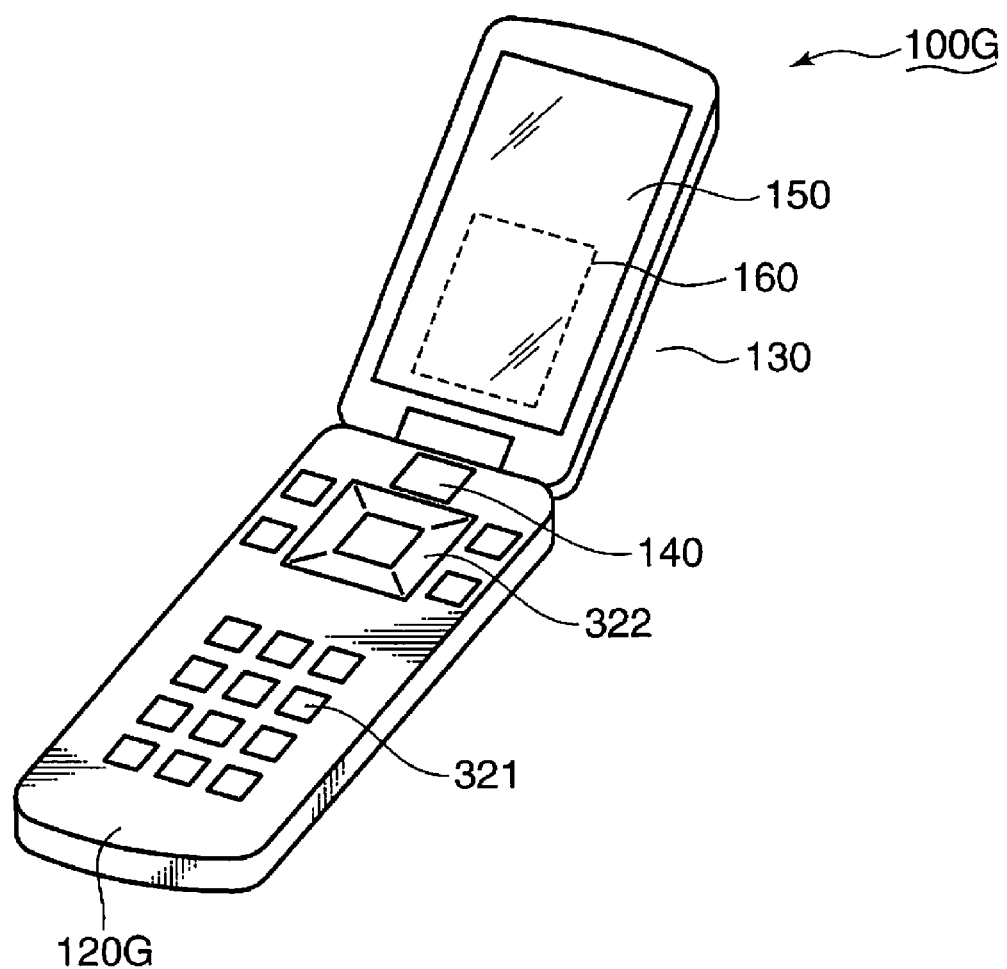
FIG. 25 is a schematic perspective view of a mobile phone exemplified as an information processor in accordance with an eighth embodiment of the invention.

FIG. 25 is a schematic perspective view of a mobile phone exemplified as an information processor in accordance with the eighth embodiment. Like elements as in the first embodiment are indicated with like reference numerals. Different features from those in the first embodiment are mainly described referring to FIG. 25. Description in the first embodiment is appropriately applied to the elements which are not described in the following.

A mobile phone 100G according to the eighth embodiment is provided with a first housing 120G and a second housing 130 rotatably connected to the first housing 120G. Buttons 321 to be used by the user for inputting telephone numbers and for performing mail communications and a control pad 322 for executing an operation relating to a program installed in the mobile phone 100G are disposed on a top surface 123 of the first housing 120G. In this embodiment, the buttons 321 and the control pad 322 are exemplified as an input section to which information to be processed is inputted. Further, the top surface 123 of the first housing 120G is exemplified as an input surface formed with the input section to which information to be processed is inputted.

The user is allowed to hold the first housing 120G and operate the buttons 321 and/or the control pad 322. Elements (e.g. an electronic circuit) configured to process information inputted through the user's manipulation of the buttons 321 and/or the control pad 322 are accommodated in the first housing 120G. Thus, the user is allowed to perform desired communications through the user's manipulation of the buttons 321 and/or the control pad 322, and/or realize a desired function equipped in the mobile phone 100G.

Similarly to the first embodiment, the rectangular second housing 130 is formed to have substantially the same size as the first housing 120G. Further, a screen 150 is attached to the second housing 130. Thus, the screen 150 attached to the second housing 130 in the first position is used as a cover for the first housing 120G, and the screen 150 attached to the second housing 130 in the second position is used as a display section on which an image is displayed.

Similarly to the first embodiment, a projector 140 is attached to the first housing 120G. The projector 140 in proximity to the second housing 130 in the second position emits light in the back side of the screen 150.

Similarly to the first embodiment, a mirror mechanism 160 is mounted on the second housing 130. The mirror mechanism 160 deflects light emitted from the projector 140 in the back side of the screen 150 toward the screen 150. The deflected light forms an image on the screen 150.

The principle of the personal computer 100 described in the context of the first embodiment is appropriately applied to the mobile phone 100G. Alternatively, the principle of the personal computers 100A, 100B, 100C, 100D, 100E, and 100F described in the context of the first through the seventh embodiments may be applied to the mobile phone. For instance, the second housing of the mobile phone may be selectively moved away or detached from the first housing. Thus, the user is allowed to project image light onto a screen device provided independently of the mobile phone, a room wall, or a ceiling to observe a desired size of an image.

The aforementioned embodiments are intended to clearly describe the principle of the invention, and should not be construed as limiting the invention thereto. Therefore, various mechanical structures, electrical structures and/or optical structures may be adopted according to the principle. For instance, various functions (e.g. a zoom function, a focus adjusting function, and a lens shift function) equipped in a typical projector may be incorporated in the information processor of the aforementioned embodiments.

An optical structure used in the information processor including a modulation element and a projection lens may be replaced by another optical structure. For instance, a projector with a scan type of an optical structure provided with a semiconductor laser or a diode-pumped solid-state laser may be applied to the information processor. Generally, as far as the scan type of the projector wherein the focal depth of a projection image is large is applied to the information processor, a clear image may be presented to the user without using a focus adjusting function.

The information processor according to the above principle is provided with a projector and a screen attached to a housing. The user is allowed to observe image light projected from the projector as an image on the screen. The user is also allowed to project an image onto another screen device provided independently of the above screen, a room wall or a ceiling as necessary. In this configuration, the user is allowed to observe an image of a desired size.

The information processor according to the aforementioned principle is provided with a screen of which tilt angle with respect to the first housing is adjustable. Preferably, the information processor is provided with a mechanism configured to keep the incident angle of projection light with respect to a screen constant during adjustment for the tilt angle. Thus, the user is allowed to view a high-quality image with less distortion.

The information processor according to the aforementioned principle is used for various purposes. As described above, a size of an image to be rendered by the information processor is adjustable. Accordingly, the information processor is appropriately used as e.g. a device for presentation to share information including an image among plural persons.

The aforementioned embodiments mainly include the following configurations.

An information processor according to an aspect of the invention includes a housing, a projector attached to the housing, and a screen attached to the housing, wherein the projector projects light onto the screen.

According to the above configuration, the projector projects light onto the screen attached to the housing. Accordingly, an image is properly displayed without a liquid crystal display. Thereby, the production cost of the information processor is appropriately reduced. Further, use of the screen, in place of a liquid crystal display including a glass member which is relatively likely to be damaged or broken, enhances impact resistance of the information processor. Since the screen is attached to the housing of the information processor, the user is allowed to carry the screen together with the projector.

In the above configuration, preferably, the housing may include a first housing configured to support the projector and a second housing rotatably connected to the first housing, and the screen may be attached to the second housing.

According to the above configuration, the second housing configured to support the screen is rotatably connected to the first housing configured to support the projector. Accordingly, the user is allowed to adjust the tilt angle of the screen with respect to the first housing by rotating the second housing.

In the above configuration, preferably, the second housing may be rotated between a first position where the second housing is folded over the first housing and a second position where the light from the projector is projected.

According to the above configuration, the second housing is rotated between the first position where the second housing is folded over the first housing and the second position where the light from the projector is projected. Accordingly, the user is allowed to use the screen attached to the second housing in the first position as a cover for the first housing. Further, the user is allowed to observe an image on the screen by rotating the second housing to the second position.

In the above configuration, preferably, the screen may include a first surface confronting the first housing when the second housing is in the first position and a second surface opposing to the first surface, and the light from the projector may be transmitted through the first surface after the light is projected onto the second surface, when the second housing is in the second position.

According to the above configuration, the screen includes the first surface confronting to the first housing when the second housing is in the first position and the second surface opposing to the first surface. The light from the projector is transmitted through the first surface after the light is projected onto the second surface, when the second housing is in the second position. Accordingly, the user is allowed to observe an image displayed on the first surface through the screen.

In the above configuration, preferably, the information processor may further include a mirror mechanism mounted to the second housing, wherein the mirror mechanism includes a mirror element configured to reflect the light from the projector onto the second surface, when the second housing is in the second position.

According to the above configuration, the mirror element of the mirror mechanism mounted to the second housing in the second position reflects the light from the projector toward the second surface. Thereafter, the light from the projector is transmitted through the first surface. Accordingly, the user is allowed to observe an image transmitted through the screen and displayed on the first surface.

In the above configuration, preferably, the mirror mechanism may include a prism element mounted to the second surface, and the prism element may change an optical path of the light so as to reduce an incident angle of the light directed to the second surface.

According to the above configuration, the prism element mounted to the second surface changes the optical path of the light so as to reduce the incident angle of the light directed to the second surface. Accordingly, light amount loss of an image to be displayed on the screen is appropriately reduced.

In the above configuration, preferably, the mirror element may include a partial reflection mirror configured to partially reflect the light from the projector to define a first optical path directed to the screen, and the partial reflection mirror may partially transmit the light from the projector to define a second optical path.

According to the above configuration, the mirror element includes the partial reflection mirror configured to partially reflect the light from the projector to define the first optical path directed to the screen. The partial reflection mirror partially transmits the light from the projector to define the second optical path. Accordingly, the user is allowed to observe an image expressed by the light propagating along the first optical path and an image expressed by the light propagating along the second optical path.

In the above configuration, preferably, the light to be projected from the projector may include image light generated by using a red light component with a red hue, a green light component with a green hue and a blue light component with a blue hue, and the screen may specifically transmit the red light component, the green light component and the blue light component.

According to the above configuration, the light to be projected from the projector includes image light generated by using a red light component with a red hue, a green light component with a green hue and a blue light component with a blue hue. The screen specifically transmits the red light component, the green light component and the blue light component. Accordingly, the user is allowed to observe a clearer image.

In the above configuration, preferably, the information processor may further include a table accommodated in the first housing, a support mechanism configured to support the projector in cooperation with the table, and an eject mechanism configured to expose the table to an exterior of the first housing, wherein the projector includes a light source configured to generate the light, a modulation element configured to form an image to be projected onto the screen, and a projection lens configured to project the light transmitted through the modulation element onto the screen, and the support mechanism moves the projection lens away from the table, when the eject mechanism exposes the table to the exterior of the first housing.

According to the above configuration, the table accommodated in the first housing is exposed to the exterior of the first housing by the eject mechanism. The support mechanism supports the projector in cooperation with the table. The projector includes the light source configured to generate light, the modulation element configured to form an image to be projected onto the screen, and the projection lens configured to project light transmitted through the modulation element onto the screen. In response to exposure of the table to the exterior of the first housing by the eject mechanism, the support mechanism moves the projection lens away from the table. As a result of adjustment for the distance between the optical path defined from the light source to the modulation element and the optical axis of the projection lens by the support mechanism, the tilt angle between the optical path from the projection lens and the optical axis of the projection lens is appropriately determined.

In the above configuration, preferably, the screen may include a first surface confronting the first housing when the second housing is in the first position, the projector may project the light onto the first surface of the screen attached to the second housing in the second position, and the first surface may reflect the light from the projector.

According to the above configuration, the screen includes the first surface confronting the first housing when the second housing is in the first position. The projector projects the light onto the first surface of the screen attached to the second housing in the second position. The first surface of the screen reflects the light from the projector. Accordingly, the user is allowed to perceive an image by the light reflected on the first surface of the screen.

In the above configuration, preferably, the first housing may include a main body configured to accommodate an element for processing information, and a rod to be displaced between a retracted position where the rod is retracted in the main body, and a protruded position where the rod is protruded from the main body, and the rod may include a support end configured to rotatably support the second housing.

According to the above configuration, the rod including the support end configured to rotatably support the second housing is displaced between the retracted position where the rod is retracted in the main body configured to accommodate the element for processing information, and the protruded position where the rod is protruded from the main body. Accordingly, the user is allowed to adjust the distance between the screen and the projector, and observe a desired size of an image.

In the above configuration, preferably, the screen may include a first screen and a second screen adjacent to the first screen, and the second screen may be placed over the first screen, when the screen is in the first position.

According to the above configuration, the screen includes the first screen and the second screen adjacent to the first screen. Accordingly, the user is allowed to observe a larger image. Further, the second screen is placed over the first screen, when the screen is in the first position. Accordingly, the information processor may be appropriately miniaturized.

In the above configuration, preferably, the projector may include a first projector configured to project first light onto a part of the screen and a second projector configured to project second light onto another part of the screen.

According to the above configuration, the first projector projects the first light onto the part of the screen. The second projector projects the second light onto another part of the screen. Accordingly, the user is allowed to observe a larger image. Alternatively, the user may be allowed to observe various kinds of images.

In the above configuration, preferably, the first housing may include a first arm configured to support the first projector and a second arm configured to support the second projector, and the first arm and the second arm may respectively include pivot ends to be pivotally connected to the main body.

According to the above configuration, the first arm supports the first projector. The second arm supports the second projector. The first arm and the second arm respectively include the pivot ends to be pivotally connected to the main body. Accordingly, the user is allowed to pivotally move the first arm and/or the second arm with respect to the main body to adjust the projection position of the first light and/or the second light.

In the above configuration, preferably, the first projector may be rotatably attached to the first arm, and the second projector may be rotatably attached to the second arm.

According to the above configuration, the first projector is rotatably attached to the first arm. The second projector is rotatably attached to the second arm. Accordingly, the user is allowed to rotate the first projector and/or the second projector with respect to the first arm and/or the second arm to adjust the projection position of the first light and/or the second light.

In the above configuration, preferably, the main body may be formed with an accommodation recess configured to accommodate the first projector and the second projector, and the first arm and the second arm may be pivotally moved between a projection position where the first projector and the second projector respectively project the first light and the second light, and a housing position where the first projector and the second projector are accommodated in the housing recess.

According to the above configuration, the user is allowed to pivotally move the first arm and the second arm to dispose the first projector and the second projector at the respective projection positions. The user is allowed to project light from the first projector and the second projector disposed at the respective projection positions to observe an image. The main body is formed with the accommodation recess configured to house the first projector and the second projector. Since the first projector and the second projector are disposed at the respective housing positions, the user is allowed to protect the first projector and the second projector using the main body.

In the above configuration, preferably, the light to be projected from the projector may include image light generated by using a red light component with a red hue, a green light component with a green hue and a blue light component with a blue hue, and the screen may specifically reflect the red light component, the green light component and the blue light component.

According to the above configuration, the light to be projected from the projector includes image light generated by using a red light component with a red hue, a green light component with a green hue and a blue light component with a blue hue. The screen specifically reflects the red light component, the green light component and the blue light component. Accordingly, the user is allowed to observe a clearer image.

In the above configuration, preferably, the information processor may further include an adjustment mechanism configured to adjust an optical path of the light from the projector in accordance with rotation of the second housing with respect to the first housing.

According to the above configuration, the adjustment mechanism adjusts the optical path of the light from the projector in accordance with the rotation of the second housing with respect to the first housing. Accordingly, the user is allowed to observe an image adjusted with the rotation of the second housing with respect to the first housing.

In the above configuration, preferably, the adjustment mechanism may include a shaft configured to connect the projector with the first housing, the shaft connected to the second housing may be rotated in association with the rotation of the second housing, and the projector may be rotated in accordance with the rotation of the shaft.

According to the above configuration, the shaft configured to connect the projector and the first housing is connected to the second housing. The shaft is integrally rotated with the rotation of the second housing. The projector is rotated in accordance with the rotation of the shaft. As a result of the above operation, the optical path of the light from the projector is adjusted in accordance with the rotation of the second housing with respect to the first housing. Accordingly, the user is allowed to observe an image adjusted in accordance with the rotation of the second housing with respect to the first housing.

In the above configuration, preferably, the adjustment mechanism may include a revolving element configured to revolve in association with the rotation of the second housing about an rotational axis of the second housing, and the projector contacted by the revolving element may be rotated around the shaft to keep an incident angle of the light with respect to the screen constant.

According to the above configuration, the projector contacted by the revolving element configured to revolve in association with the rotation of the second housing about the rotational axis of the second housing is rotated around the shaft. As a result of the above operation, the incident angle of the light with respect to the screen is kept constant. Accordingly, the user is allowed to observe an image adjusted to decrease a quality variation resulting from the rotation of the second housing with respect to the first housing.

In the above configuration, preferably, the projector may include a light source configured to generate the light, a modulation element configured to form an image to be projected onto the screen, and a projection lens configured to project the light transmitted through the modulation element onto the screen, and the adjustment mechanism may adjust a distance between an optical axis of the projection lens and the modulation element in accordance with the rotation of the second housing.

According to the above configuration, the projector includes the light source configured to generate light, the modulation element configured to form an image to be projected onto the screen, and the projection lens configured to project the light transmitted through the modulation element onto the screen. The adjustment mechanism adjusts the distance between the optical axis of the projection lens and the modulation element in accordance with the rotation of the second housing. As a result of the above operation, the angle between the angle of the light to be emitted from the projection lens and the optical axis of the projection lens is adjusted in accordance with the rotation of the second housing with respect to the first housing.

In the above configuration, preferably, the light source may be a light emitting diode, a semiconductor laser or a diode-pumped solid-state laser.

According to the above configuration, the user is allowed to observe a high luminance image.

In the above configuration, preferably, the first housing may include an input surface formed with an input section for allowing a user to input information to be processed, and the screen attached to the second housing in the first position may cover the input surface.

According to the above configuration, the first housing includes the input surface formed with the input section for allowing the user to input information to be processed. The input surface is appropriately protected by the screen attached to the second housing in the first position.

In the above configuration, preferably, the second housing may be configured to be detachable from the first housing.

According to the above configuration, the user is allowed to detach the second housing from the first housing. Accordingly, the user is allowed to project the light from the projector attached to the first housing onto a desired position, and input information into the input section.

In the above configuration, preferably, the information processor may include a laptop computer or a mobile phone.

According to the above configuration, as compared with a laptop computer or a mobile phone with a liquid crystal display, a less expensive laptop computer or mobile phone is provided. Further, as compared with a laptop computer or a mobile phone with a liquid crystal display, a high impact-resistant laptop computer or mobile phone is provided. In addition, as compared with a laptop computer or a mobile phone with a liquid crystal display, a lightweight laptop computer or a mobile phone is provided.

This application claims the priority of U.S. Provisional Patent Application No. 61/235,134 (filing date: Aug. 19, 2009).

The specific embodiments or practical examples described in the detailed explanation of the invention merely clarify the technical nature of the invention, which should not be understood as narrowly limited to such specific examples. Various modifications may be made within the spirit of the invention and within the scope of the claims described herebelow.

What is claimed is:

1. An information processor comprising:
a first housing;
a projector supported by the first housing;
a second housing rotatably connected to the first housing; and
a screen attached to the second housing, wherein
the projector is configured to project light onto the screen, and
an adjustment mechanism configured to move the projector so as to adjust an optical path of the light from the projector in accordance with rotation of the second housing with respect to the first housing.

2. The information processor according to claim 1, wherein the second housing is configured to be rotated between a first position in which the second housing is folded over the first housing and a second position in which the light from the projector is capable of being projected thereon.

3. The information processor according to claim 2, wherein the screen includes a first surface adjacent the first housing when the second housing is in the first position and a second surface opposed to the first surface, and the light from the projector is capable of being transmitted through the first surface after the light is projected onto the second surface, when the second housing is in the second position.

4. The information processor according to claim 3, further comprising
a mirror mechanism mounted to the second housing, wherein
the mirror mechanism includes a mirror element configured to reflect the light from the projector onto the second surface, when the second housing is in the second position.

5. The information processor according to claim 4, wherein
the mirror mechanism includes a prism element mounted to the second surface, and
the prism element is configured to change the optical path of the light so as to reduce an incident angle of the light directed to the second surface.

6. The information processor according to claim 4, wherein
the mirror element includes a partial reflection mirror configured to partially reflect the light from the projector to define a first optical path directed to the screen, and
the partial reflection mirror is configured to partially transmit the light from the projector to define a second optical path.

7. The information processor according to claim 3, wherein
the projector includes a red light component, a green light component, and a blue light component, and the projector is configured to project image light generated by the red light component with a red hue, the green light component with a green hue and the blue light component with a blue hue, and
the screen is specifically configured to transmit the red light component, the green light component and the blue light component.

8. The information processor according to claim 4, further comprising
a table accommodated in the first housing;
a support mechanism configured to support the projector in cooperation with the table; and
an eject mechanism configured to expose the table to an exterior of the first housing, wherein
the projector includes a light source configured to generate the light, a modulation element configured to form an image to be projected onto the screen and a projection lens configured to project the light transmitted through the modulation element onto the screen, and
the support mechanism is configured to move the projection lens away from the table, when the eject mechanism exposes the table to the exterior of the first housing.

9. The information processor according to claim 2, wherein
the screen includes a first surface adjacent the first housing when the second housing is in the first position,
the projector is configured to project the light onto the first surface of the screen attached to the second housing in the second position, and
the first surface is configured to reflect the light from the projector.

10. The information processor according to claim 9, wherein
the first housing includes
a main body configured to accommodate a device for processing information, and
a rod configured to be displaced between a retracted position where the rod is retracted in the main body and a protruded position where the rod is protruded from the main body, and
the rod includes a support end configured to rotatably support the second housing.

11. The information processor according to claim 10, wherein
the screen includes a first screen and a second screen adjacent to the first screen, and
the second screen is placed over the first screen, when the screen is in the first position.

12. The information processor according to claim 9, wherein
the projector includes a first projector configured to project first light onto a part of the screen and a second projector configured to project second light onto another part of the screen.

13. An information processor comprising:
a first housing including a main body, which accommodates a device for processing information, and a rod, which is capable of being displaced between a retracted position where the rod is retracted in the main body and a protruded position where the rod is protruded from the main body;
a projector supported by the first housing;
a screen onto which the projector is configured to project light; and
a second housing connected to the first housing so as to be capable of rotating between a first position, where the second housing is folded over the first housing, and a second position where the projector projects the light onto the screen, wherein
the screen includes a first surface adjacent the first housing when the second housing is in the first position,
the projector is configured to project the light onto the first surface of the screen attached to the second housing in the second position, the first surface is configured to reflect the light from the projector,
the rod includes a support end configured to rotatably support the second housing,
the projector includes a first projector configured to project first light onto a part of the screen and a second projector configured to project second light onto another part of the screen,
the first housing includes a first arm configured to support the first projector and a second arm configured to support the second projector, and
the first arm and the second arm respectively include pivot ends configured to be pivotally connected to the main body.

14. The information processor according to claim 13, wherein
the first projector is rotatably attached to the first arm, and the second projector is rotatably attached to the second arm.

15. An information processor comprising:
a first housing including a main body, which accommodates a device for processing information, and a rod, which is capable of being displaced between a retracted position where the rod is retracted in the main body and a protruded position where the rod is protruded from the main body;
a projector supported by the first housing;
a screen onto which the projector is configured to project light; and
a second housing connected to the first housing so as to be capable of rotating between a first position where the second housing is folded over the first housing and a second position where the projector projects the light onto the screen, wherein the screen includes a first surface adjacent the first housing when the second housing is in the first position, the projector is configured to project the light onto the first surface of the screen attached to the second housing in the second position, the first surface is configured to reflect the light from the projector, the rod includes a support end configured to rotatably support the second housing, the projector includes a first projector configured to project first light onto a part of the screen and a second projector configured to project second light onto another part of the screen, the main body includes an accommodation recess configured to accommodate the first projector and the second projector, and the first arm and the second arm are capable of being pivotally moved between a projection position where the first projector and the second projector respectively project the first light and the second light and an accommodation position where the first projector and the second projector are accommodated in the accommodation recess.

16. The information processor according to claim 9, wherein the projector includes a red light component, a green light component, and a blue light component, and the projector is configured to project image light generated by the red light component with a red hue, the green light component with a green hue and the blue light component with a blue hue, and the screen is specifically configured to transmit the red light component, the green light component and the blue light component.

17. The information processor according to claim 1, wherein the adjustment mechanism includes a shaft configured to connect the projector with the first housing, the shaft connected to the second housing is configured to be rotated in coordination with the rotation of the second housing, and the projector is configured to be rotated in accordance with the rotation of the shaft.

18. The information processor according to claim 17, wherein the adjustment mechanism includes a revolving element configured to revolve in coordination with the rotation of the second housing about a rotational axis of the second housing, and the projector contacted by the revolving element is configured to be rotated around the shaft to keep an incident angle of the light with respect to the screen constant.

19. The information processor according to claim 1, wherein the projector includes a light source configured to generate the light, a modulation element configured to form an image to be projected onto the screen and a projection lens configured to project the light transmitted through the modulation element onto the screen, and the adjustment mechanism is configured to adjust a distance between an optical axis of the projection lens and the modulation element in accordance with the rotation of the second housing.

20. The information processor according to claim 19, wherein the light source is a light emitting diode, a semiconductor laser or a diode-pumped solid-state laser.

21. The information processor according to claim 2, wherein the first housing includes an input surface having an input section configured to enable a user to input information to be processed, and the screen attached to the second housing in the first position covers the input surface.

22. The information processor according to claim 21, wherein the second housing is configured to be detachable from the first housing.

23. The information processor according to claim 1, wherein the information processor includes a laptop computer or a mobile phone.

24. The information processor according to claim 1, wherein the adjustment mechanism is configured to rotate the projector relative to the first housing.

* * * * *